(12) United States Patent
Nimura et al.

(10) Patent No.: US 7,315,341 B2
(45) Date of Patent: Jan. 1, 2008

(54) LIQUID CRYSTAL DISPLAY DEVICE WITH RETARDATION LAYER WITH DIFFERENT RELATIVE HUMIDITY

(75) Inventors: Shigeaki Nimura, Minami-ashigara (JP); Shinichi Morishima, Minami-ashigara (JP); Masaki Noro, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 450 days.

(21) Appl. No.: 10/990,985

(22) Filed: Nov. 18, 2004

(65) Prior Publication Data

US 2005/0140881 A1 Jun. 30, 2005

(30) Foreign Application Priority Data

Nov. 18, 2003 (JP) ............................. 2003/388308

(51) Int. Cl.
*G02F 1/1335* (2006.01)

(52) U.S. Cl. ..................... 349/117; 349/118; 349/119; 349/120; 349/121

(58) Field of Classification Search ......... 349/117–121
See application file for complete search history.

(56) References Cited

U.S. PATENT DOCUMENTS 6,881,457 B2 * 4/2005 Tasaka et al. ............... 428/1.3
6,892,242 B1 * 5/2005 Tamayama .................. 709/231

FOREIGN PATENT DOCUMENTS

| JP | 2001-114914 | | 4/2001 |
|---|---|---|---|
| JP | 2002071949 | * | 3/2002 |

* cited by examiner

*Primary Examiner*—David Nelms
*Assistant Examiner*—Hoan C. Nguyen
(74) *Attorney, Agent, or Firm*—Buchanan Ingersoll & Rooney PC

(57) ABSTRACT

Disclosed is a liquid crystal display device wherein an optically anisotropic layer is formed on an optical film satisfying that Rth is 0 to 150 nm at 23° C./60% RH and the difference between Rth at 23° C./10% RH and Rth at 23° C./80% RH is 40% or less of Rth at 23° C./60% RH. In the liquid crystal display, liquid crystal cells are optically compensated accurately and less affected in the display properties even when the storage environment changes.

20 Claims, 2 Drawing Sheets

LIQUID CRYSTAL DISPLAY DEVICE WITH RETARDATION LAYER WITH DIFFERENT RELATIVE HUMIDITY

BACKGROUND OF THE INVENTION

1. Field of the Invention

The present invention relates to a liquid crystal display device and in particular to a vertically oriented liquid crystal display device excellent in characteristics of viewing angle.

2. Description of the Related Art

A liquid crystal display device comprises a liquid crystal cell and a polarizing plate. The foregoing polarizing plate is provided with a protective film and a polarizing film, and can be obtained by staining with iodine a polarizing film made of, for example, polyvinyl alcohol film, stretching the resulting film and laminating both sides with protective films. In a transmission-type liquid crystal display device, the polarizing plates may be fixed on both sides of the liquid crystal cell and one or more optically compensated sheets (optically anisotropic layers) may also be disposed thereto. In a reflection-type liquid crystal display device, components are disposed in the order of a reflector plate, a liquid crystal cell, one or more optically compensated sheets and a polarizing plate. The liquid crystal cell consists of liquid crystal molecules, two substrates for sealing them and an electrode layer for energizing the liquid crystal molecules. Display modes such as TN (Twisted nematic), IPS (In-Plane Switching), OCB (Optically Compensatory Bend), VA (Vertically Aligned) and ECB (Electrically Controlled Birefringence) for which an ON/OFF display is carried out due to a difference in the orienattion status of liuid crystal molecules and can be applied either to a transmission-type or a reflection-type system are proposed.

Among these liquid crystal displays (LCD), nematic liquid crystal molecules having positive dielectric anisotropy are used in applications where a high display quality is needed. More particularly, a 90-degree twisted nematic-type liquid crystal display device driven by a thin layer transistor (hereinafter referred to as TN mode) is mainly used. Although, the TN mode has excellent display properties when viewed from the front, it also has problematic characteristics of viewing angle such as a reduction in contrast when viewed in the oblique direction and deterioration in display properties due to occurrence of tone reversal in which brightness is reversed by gradation display, therefore, improvement has strongly demanded.

A vertical oriented nematic-type liquid crystal display device (hereinafter referred to as VA mode) has been proposed in recent years in which nematic liquid crystal molecules having negative dielectric anisotropy are used to allow the long axes of liquid crystal molecules to orient approximately vertical to a substrate, with no voltage applied, and these crystal molecules are driven by a thin-layer transistor as an LCD system for improving these characteristics of viewing angle (see, for example, Japanese Patent Laid-open Publication (KOKAI, hence force referred to as "JP-A") No. 2-176625). The VA mode is not only excellent in display properties when viewed from the front, as with the TN mode, but also presents a wider viewing angle through application of a retardation film for compensating the viewing angle. It is also known that the VA mode is capable of providing a wider field-angle characteristic by using two negative monoaxial retardation films having the optical axis in the direction orthogonal to a film plane above and below the liquid crystal cell, and a monoaxial retardation film having a positive refractive-index anisotropy with the in-plane retardation value of 50 nm is being used in this LCD to attain a wider field-angle characteristic as well (see SID 97 DIGEST from page 845 to 848).

However, use of the three retardation films would not only increase production costs but also decrease the yield for laminating a mass of films, thereby resulting in an increase in thickness of a plurality of films and posing problems in making a display device thinner. In addition, since a pressure-sensitive adhesive layer is used for laminating stretched films, the pressure-sensitive adhesive layer may contract due to a change in temperature or moisture, thus resulting in defects such as peeling between the films and warpage.

Methods for improving these defects including a method for reducing the number of retardation films and a method for using cholesteric liquid crystal layers have been disclosed (see JP-A-11-95208). However, these methods also have required laminating a plurality of films, and have not been sufficient in terms of making the device thinner or reducing the production costs.

In addition, proposed is a method in which discotic liquid crystal compounds are used for the purpose of improving the above problems (see JP-A-11-352328). This method is, however, difficult in provision of a longitudinal optical film with an optically anisotropic layer and lower in productivity. A method for solving this problem has also been disclosed (see JP-A-2000-304931).

These retardation films have problems that their basic properties may vary greatly depending on changes in the storage environment. More particularly, it has been found that any change in temperature and humidity may increase or decrease retardation in the thickness direction, thereby reducing the effect of widening the viewing angle.

Proposed is a VA optical film with less temperature/humidity dependence as a method for solving the change in the storage environment (see JP-A-2001-114914). The film is assuredly smaller in temperature dependence and less influenced by the variation in the Rth but not sufficiently effective in widening the viewing angle (fundamental performance). Therefore, what has been requested is a VA retardation film which is sufficiently effective in widening the viewing angle as a fundamental performance and at the same time less affected in fundamental performance due to environmental change.

The present invention is to provide a liquid crystal display device wherein liquid crystal cells are optically compensated accurately and smaller in the number of the films to be laminated, thereby successfully making the device thinner and, in particular, a liquid crystal display device (VA mode) which is less affected in the fundamental performance due to any changes in the storage environment.

SUMMARY OF THE INVENTION

The purpose of the invention has been accomplished by the following (1) to (7):

(1) A liquid crystal display device comprising a pair of polarizing plates, a liquid crystal cell, a first optically anisotropic layer and a second optically anisotropic layer, wherein the liquid crystal cell, the first optically anisotropic layer and the second optically anisotropic layer are disposed between the polarizing plates, the polarizing plate comprises a polarizing film or the polarizing plate comprises a polarizing film and a protective film on a plane of the polarizing film nearer to the liquid crystal cell, the pair of polarizing plates are at right angles to each other at the absorption axes of the respective polarizing films, the liquid crystal cell comprises a pair of substrates and a liquid crystal layer containing liquid crystal molecules interposed between the substrates, the liquid crystal molecules are oriented approximately perpendicular to the substrate of the liquid crystal cell, the first optically anisotropic layer is 40 to 200 nm in retardation value (Re) in an in-plane direction with respect to visible light, the second optically anisotropic layer is of an optically negative refractive anisotropy, 10 nm or lower in Re with respect to visible light and 30 to 250 nm in retardation value (Rth) in the thickness direction, at least one of the first optically anisotropic layer and the second optically anisotropic layer is formed on an optical film satisfying that Rth is 0 to 150 nm at 23° C./60% RH and the difference between Rth at 23° C./10% RH and Rth at 23° C./80% RH is 40% or less of Rth at 23° C./60% RH, and the optical film may be the substrate of the liquid crystal cell, the protective film on a plane of the polarizing film nearer to the liquid crystal cell, or the polarizing film.

(2) A liquid crystal display device described in the above (1) wherein the Re of the optical film is |Re|≦15 nm and variation range in the angle of a slow axis is below 3 degrees.

(3) A liquid crystal display device described in the above (1) or (2) wherein the first optically anisotropic layer is a monoaxial optically anisotropic layer.

(4) A liquid crystal display device described in the above (1) or (2) wherein the first optically anisotropic layer is a biaxial optically anisotropic layer.

(5) A liquid crystal display device described in any of the above (1) through (4) wherein the first optically anisotropic layer contains at least one kind of rod-like liquid crystal molecule.

(6) A liquid crystal display device described in any one of the above (1) through (5) wherein the second optically anisotropic layer contains at least one kind of discotic liquid crystal molecule.

(7) A liquid crystal display device described in any one of the above (1) through (6) wherein the second optically anisotropic layer is a biaxial optically anisotropic layer.

The present invention provides a liquid crystal display device wherein liquid crystal cells are optically compensated accurately and smaller in the number of cells to be laminated, thereby successfully making the device thinner and, in particular, a liquid crystal display device for VA mode which is less affected in fundamental performance even when the storage environment changes.

BEST MODE FOR CARRYING OUT THE INVENTION

The liquid crystal display of the invention will be explained in detail hereafter. It should now be noted that, in this document, any notation using a word "to" indicates a range defined by values placed before and after such word, where both ends of such range are included as minimum and maximum values. The term "substantially" used in referring to the angle means within a strict angle±5°. The strict angle is preferably less than 4° in error and more preferably less than 3°. Further, the measured wavelength of the refractive index is λ=550 nm in a visible light range, unless otherwise specified. In the description, "visible light" is light of wavelength of 400 nm to 700 nm, and the measured wavelength of the refractive index is λ=550 nm in a visible light range, unless otherwise specified.

In this instance, Rth and Re denote;

$$Rth=((nx+ny)/2-nz)\times d \qquad \text{Formula (I)}$$

$$Re=(nx-ny)\times d \qquad \text{Formula (II)}$$

In the formula (I) or (II), nx denotes a refractive index in the in-plane slow axis direction, ny denotes a refractive index in the in-plane direction orthogonal to nx, and nz denotes a refractive index in the thickness direction. Where no slow axis is in the plane, nx=ny, wherein d denotes the thickness (nm).

[Liquid Crystal Display Device]

Figure 1:
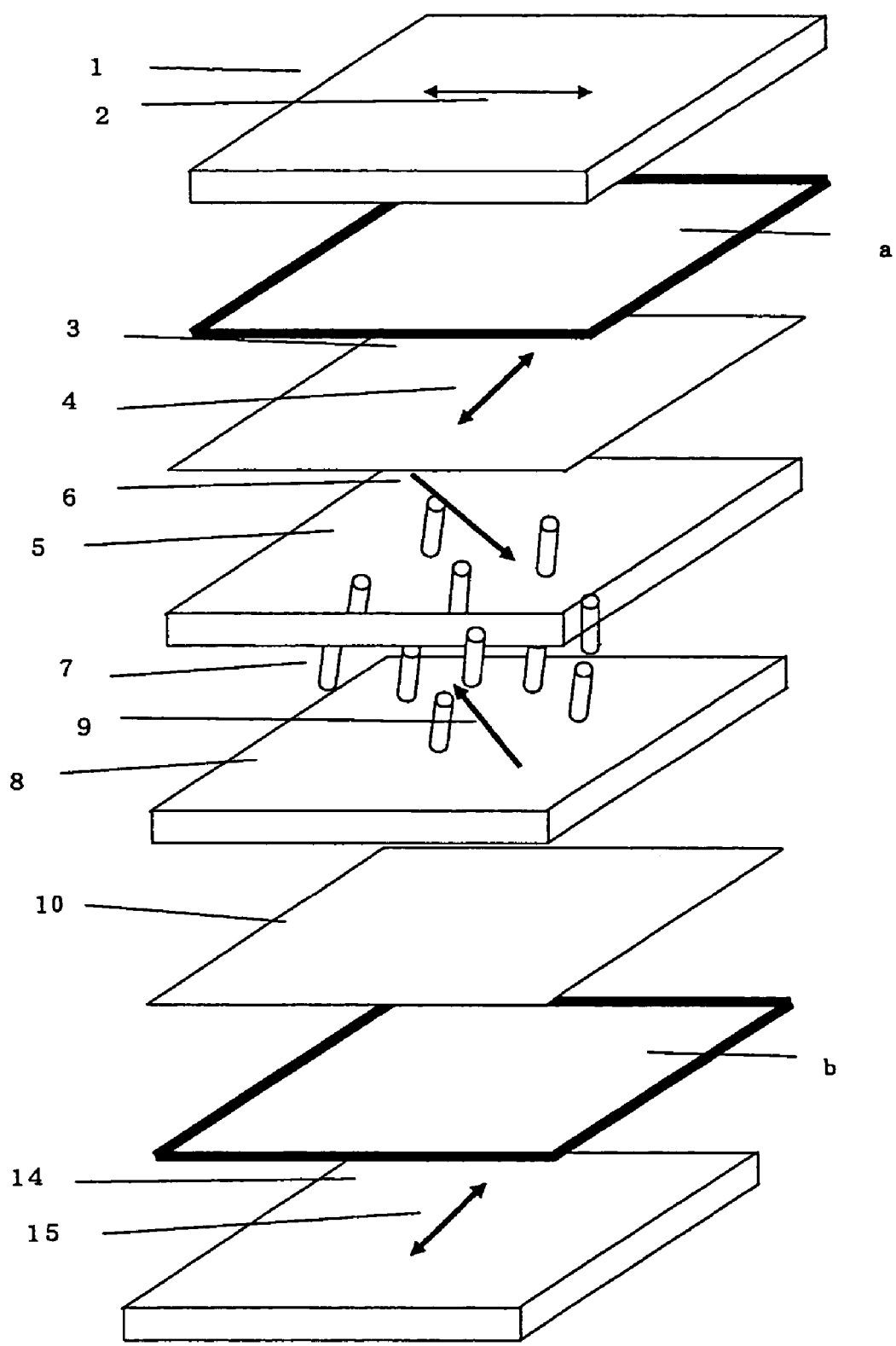
FIG. 1 is a schematic view showing one example of a liquid crystal display device according to the invention.
Figure 2:
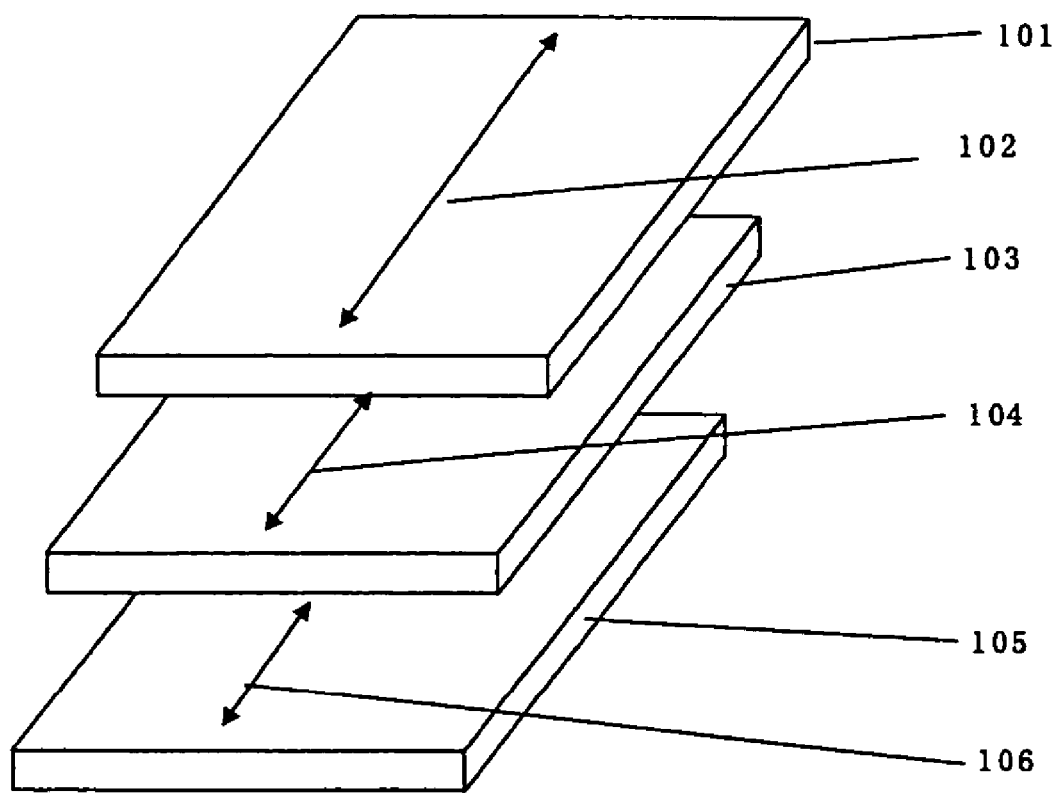
FIG. 2 is a schematic view showing one example of a polarizing plate usable in the invention.

The present invention is concretely described. First, one embodiment of the liquid crystal display device of the invention is described. FIG. 1 is a pattern diagram showing an example of the liquid crystal display device of the invention, and FIG. 2 is a pattern diagram showing an example of a polarizing plate applicable to the invention. FIG. 1 will be explained by referring to an example where a nematic liquid crystal having negative dielectric anisotropy as a field-effect type liquid crystal is used to cause active driving.

In FIG. 1, the liquid crystal display device has liquid crystal cells (5 to 8) and a pair of polarizing plates 1 and 14 disposed on both sides of the liquid crystal cells. The optically anisotropic layer 3 is disposed between the polarizing plate 1 and the liquid crystal cells 5 to 8, and the optically anisotropic layer 10 is disposed between the polarizing plate 14 and the liquid crystal cells 5 to 8. The liquid crystal cell consists of the upper electrode substrate 5, the lower electrode substrate 8 and the liquid crystal molecule 7 interposed therebetween. The liquid crystal molecule 7 is controlled so as to orient along the rubbing directions 6 and 9 given on the opposing planes of the electrode substrates 5 and 8 in the direction approximately perpendicular to the substrate at a non-driven state to which no external electric field is applied. The upper polarizing plate 1 and the lower polarizing plate 14 are laminated in such a manner that the absorption axis 2 is approximately orthogonal to the absorption axis 15. The optical film and the optical film b are also provided for supporting the optically anisotropic layer.

As shown in FIG. 2, the polarizing plates 1 and 14 consist of a polarizing film 104 interposed between the protective films 101 and 105, respectively. The polarizing plates 1 and 14 can be prepared by staining a polarizing film made of, for example, polyvinyl alcohol with iodine and stretching to produce the polarizing film 104, both planes of which are laminated with the protective films 101 and 106. During lamination, three films consisting of a pair of protective films and a polarizing film are bonded together by a roll-to-roll process, which is preferable in terms of productivity. Also, as shown in FIG. 2, in the roll-to-roll lamination, the lamination can be easily performed so that the slow phase axes 102 and 106 of the protective films 101 and 105 are parallel to the absorption axis 106 of the polarizing film 104, and a polarizing plate which is not likely to change in dimensions of the polarizing plate or cause curl and is highly mechanically stable is preferable. In addition, the same effect can be obtained, if at least 2 axes of three films, for example, the slow axis of one protective film and the absorption axis of the polarizing film or slow phase axes of 2 protective films are substantially parallel. In FIG. 2, the protective film is structured so as to be provided on both planes of the polarizing film, however, it is not limited thereto, as long as it is not deviate from the object of the invention, a structure in which a protective film is provided only on one plane or a structure with no protective film may be used.

Again in FIG. 1, the optically anisotropic layer 3 is, for example, an optically monoaxial retardation film or an optically biaxial retardation film, with no particular restrictions, and may be composed of norbornene polymers, polycarbonate polymers, polyalylate polymers, polyester polymers, polysulfone, or polymers prepared by mixing 2 or more types of these polymers. Preferable are those which are excellent in easy control of birefringence characteristics at work, transparency and heat resistance. Further, the optically anisotropic layer 10 is, for example, composed of a discotic liquid crystal molecule, having optically negative refractive-index anisotropy, or preferably an optically anisotropic layer consisting of discotic liquid crystal compounds whose Re is −10 to 10 nm and which is of a substantially horizontal orientation. These optically anisotropic layers 3 and 10 eliminate image coloration of liquid crystal cells and also contribute to widening the viewing angle.

In addition, in the liquid crystal display device shown in FIG. 1, one layer of the optically anisotropic layer 10 consisting of discotic liquid crystal compounds is illustrated, however, the optically anisotropic layer 10 may compose of 2 or more layers, or it may be laminated with, for example, other polymers than discotic liquid crystal compounds.

On the assumption that in FIG. 1 the upper side is an observation side, a structure is shown in which the optically anisotropic layer 3 is disposed between the polarizing plate 1 on the observation side and the substrate 5 of the liquid crystal cell on the observation side, and the optically anisotropic layer 10 is structurally disposed between the polarizing plate 14 on the back side and the substrate 8 of the liquid crystal cell on the back side in FIG. 1, however, a structure in which the optically anisotropic layer 3 is positioned the optically anisotropic layer 10 or vice versa may be adopted, or a structure in which the optically anisotropic layers 3 and 10 are disposed between the polarizing plate 1 on the observation side and the substrate 5 of the liquid crystal cell on the observation side may also be adopted. Additionally, a structure in which the optically anisotropic layers 3 and 10 are disposed between the polarizing plate 14 on the back side and the substrate 8 of the liquid crystal cell on the back side may be adopted. In these structures, the optically anisotropic layer 10 may be used as an optical film of the optically anisotropic layer 3.

The optically anisotropic layer 3 may be constituted integrally with the polarizing plate 1 and can be built into the liquid crystal display device, being integral with the polarizing plate 1. For example, the optical film of the first optically anisotropic layer may be allowed to function as a protective film for either side of the polarizing films, and it is preferable that the optical film is allowed to function as an integrally laminated polarizing plate in the order of a protective film, a polarizing film, a protective film (also acting as a transparent optical film) and an optically anisotropic layer. Where the integral polarizing plate is built into the liquid crystal display device, it is preferable to build in in the order of the protective film, the polarizing film, the protective film (also acting as a transparent optical film) and the optically anisotropic layer 3 outside of the device (a side further from the liquid crystal cell).

The same is also applicable to the optically anisotropic layer 10. It can be built into the liquid crystal display device as an integral-type polarizing plate with which the polarizing plate 14 is integrally constituted. In an embodiment where the optically anisotropic layer 10 is made of liquid crystal compounds, either one of the protective films for the polarizing plate 14 may also be used as a transparent optical film for the optically anisotropic layer 10. In this embodiment, an integral polarizing plate is made by laminating in the order of a protective film, a polarizing film, a protective film (also acting as an optical film) and an optically anisotropic layer 10, and it is preferable that the integral polarizing plate is built into the liquid crystal display device in the order of the protective film, the polarizing film, the protective film (also acting as an optical film) and the optically anisotropic layer 10 outside of the device (a side further from the liquid crystal cell).

The liquid crystal display device of the invention shall not be restricted to the above structures and may include other members. For example, a color filter may be disposed between a liquid crystal cell and a polarizing film. Further, in an embodiment of the transmission liquid crystal display device, a backlight, whose light source is a hot-cathode fluorescent tube, a light-emitting diode or an electro-luminescent element may be disposed on the back plane. On the other hand, in an embodiment of the reflection-type liquid crystal display device, it is sufficient to dispose one polarizing plate on the observation side, and a reflection film is provided on the back plane of the liquid crystal cell or on the in-plane of the lower substrate of the liquid crystal cell. As a matter of course, the liquid crystal cell may be provided on the observation side with a front light using the light source. A semi-transmission type in which a transmission part and reflection part are provided in one pixel of the display device is also possible.

The liquid crystal display device of the invention is not restricted to a type in particular, and many include any of image direct view type, image projection type and light modulation type liquid crystal display devices. An active matrix liquid crystal display device in which 3- or 2-terminal semiconductor devices such as TFT and MIM are used is effective in the invention. As a matter of course, also effective is a passive matrix liquid crystal display device denoted by STN type which is driven by so-called time-division driving.

[VA-Mode Liquid Crystal Cell]

In the present invention, preferable is a VA-mode liquid crystal cell. The VA-mode liquid crystal cell is structured in that molecules with dielectric anisotropy are sealed between the upper and lower substrates whose opposing plane is subjected to rubbing treatment. For example, liquid crystal molecules with approximately $\Delta n=00813$ and $\Delta \epsilon=-4.6$ may be used to prepare a liquid crystal cell in which the tilt angle or direction indicating orientation of liquid crystal molecules is approximately 89°. In this instance, the liquid crystal layer can be made approximately 3.5 μm in thickness d. Brightness during white indication varies depending on the size of product $\Delta n d$ of thickness d of the liquid crystal layer with the refractive-index anisotropy $\Delta n$. The liquid crystal layer is preferably 2 to 5 μm in thickness d in order to obtain a maximum brightness.

A transparent electrode (not illustrated here) is formed inside the substrates 5 and 8. In a non-driven state where no drive voltage is applied to the electrode, the liquid crystal molecules 7 in the liquid crystal layer orient approximately perpendicular to the substrate plane and consequently the light passing through the liquid crystal panel hardly undergoes change in the polarization state. As explained above, since the absorption axis 2 of the upper polarizing plate 1 on the liquid crystal cell is approximately orthogonal to the absorption axis 15 of the lower polarizing plate 14, light will not pass through the polarizing plate, more particularly, in the liquid crystal display device as shown in FIG. 1, an ideal black indication is obtained at a non-driven state. In contrast, in a driving state, liquid crystal molecules slant toward the direction parallel to the substrate plane, and the light passing through the liquid crystal panel changes the polarization state through such slanted liquid crystal molecules, passing through the polarizing plate.

An example is given in which a liquid crystal material with negative dielectric anisotropy that allows liquid crystal molecules to respond in the direction orthogonal to the direction of electric field is used, because the electric field is applied between the upper and lower substrates. Where an electrode is disposed on one of the substrates and the electric field is applied in a horizontal direction parallel to the substrate plane, the liquid crystal material having positive dielectric anisotropy may be used.

In a VA-mode liquid crystal display device, chiral materials commonly used in a TN-mode liquid crystal display device are added less frequently, because of deterioration of dynamic response characteristics, but may be sometimes added for reducing errors in orientation.

The VA mode is characterized as having a fast response and a high contrast. It has a problem that the contrast is high when viewed from the front but lower when viewed in the oblique direction. During black indication, liquid crystal molecules are oriented in the direction orthogonal to the substrate plane. When observed in front, the high contrast can be obtained because birefringence is hardly found in liquid crystal molecules to give a low transmission efficiency. However, when observed in the oblique direction, birefringence is found in liquid crystal molecules. Further, the crossing angle between the absorption axis of the lower polarizing plate and that of the upper polarizing plate is vertically 90° when viewed from the front, but exceeds 90° when viewed in the oblique direction. Due to these two factors, leaked light occurs in the oblique direction and contrast is reduced. In the present invention, the optically anisotropic layers 3 and 10 are provided with at least one layer respectively to solve these problems.

In the VA mode, liquid crystal molecules are slanted during white indication, and the birefringence of liquid crystal molecules is different in size in the slant direction and also in the reversal direction when viewed in the oblique direction, thereby producing a difference in illuminance and tonality. In order to solve this problem, it is preferable to make the structure of the liquid crystal cell with a multi-domain. The multi-domain is a structure in which a plurality of domains different in orientation states are formed in one pixel. For example, in a multi-domain type VA-mode liquid crystal cell, there are a plurality of domains that exist different in the tilt angle of the liquid crystal molecules during application of electric field in one pixel. In the multi-domain VA-mode liquid crystal cell, the tilt angle of liquid crystal molecules by application of electric field can be averaged for each pixel, thereby the viewing angle characteristic can be averaged. In order to divide the orientation within one pixel, an electrode is provided with a slit or a projection to change the direction of the electric field or to allow bias in the density of the electric field. A uniform viewing angle in all directions can be obtained by increasing the number of such divisions, and an approximately uniform viewing angle can be obtained by attaining 4 or more than 8 orientation divisions.

There is also a case where liquid crystal molecules may have difficulty in making response at domain borders of the orientation division. Therefore, since a black indication is maintained for a normally black indication, reductions in luminance is a problem. Addition of chiral agents to liquid crystal materials contributes to reducing the domain borders. Thus, as shown in the optical films and b in FIG. 1, the optical film in which the Rth at 23° C. and 60% RH is adjusted to 0 to 150 nm is disposed in the liquid crystal display device of the invention.

[Optical Film]

Further, the optical film (hereinafter it may be referred to as film) will be explained by referring to cases of cellulose ester films in which lower fatty acid esters of cellulose or acetyl cellulose in particular are contained as a major ingredient, however, the optical film used in the invention shall not be restricted thereto.

The above-described cellulose ester film containing acetyl cellulose as a major ingredient is dissolved inorganic solvents such as methylene chloride, ethanol, acetone and methanol to prepare a dope. The concentration of acetyl cellulose in the dope ranges from 10 to 35 wt %. Plasticizers such as phthalate ester and phosphate ester may be added to acetyl cellulose in at 3 to 20% by mass. In addition, additive agents such as ultraviolet absorbers and lubricants may be added, whenever necessary. Thus the obtained dope is cast on an optical film to form a film.

The optical film of the invention may be prepared by a banding method or drum method. Thus the prepared film is then peeled off from a band or a drum as an optical film. The film is then transferred through a drying zone to dry.

In this instance, it is preferable to adjust a quantity of remaining solvents to 10 to 120% during peeling the film off the belt (band) or the drum. The quantity exceeding 120% may fail to attain a sufficient drying of the film and also have difficulty in peeling the film, which are disadvantages in commercial production of the film. A more preferable quantity of remaining solvents is 15 to 100% and a particularly preferable quantity is 20 to 80%.

A quantity of remaining solvents in the film of the invention can be represented by the following formula.

Quantity of remaining solvents=quantity of remaining volatile mass/film mass after heat treatment×100%

The remaining volatile mass is a value obtained by subtracting a film mass after heat treatment from a film mass before heat treatment when the film is heated at 115° C. for 1 hour.

In order to raise Rth, it is preferable to have a smaller quantity of remaining solvents after the film production or the winding process. Therefore, a quantity of remaining solvents during the winding process after the film production preferably reduces by 10% or more than a quantity of remaining solvents duirng peeling, more preferably by 15% or more and particularly preferably by 20% or more.

In the production process the above optical film, it is preferable that a drying process where a film is peeled off from the belt or the drum and is wound to be roll-like is adjusted so that the highest temperature set in the drying process is lower than the glass transition temperature of the film. In a temperature range higher than the glass transition temperature, a disturbance in the molecular orientation occurs, which may result in a substantial deterioration in film surface quality.

The temperature set in the above-described drying process is preferably Tg (denotes glass transition temperature) to (Tg−70° C.), more preferably Tg to (Tg−50° C.), and particularly preferably Tg to (Tg−30° C.).

Further, the optical film of the invention is characterized in that the difference between Rth at 23° C. and 10% RH and Rth at 23° C. and 80% RH is 40% or less of Rth at 23° C. and 60% RH. Preferably is 30% or less and more preferably is 20% or less.

"At 23° C. and 60% RH" described in the invention means to allow measurement samples cut in 35 mm×35 mm to leave at 23° C. and 60% RH for 8 hours and then measure the sample under the same conditions.

In addition, the Re of the optical film of the invention is preferably in a range from −15 to 15 nm, and a variation in the angle of the slow axis is 3° or lower. The angle range is effective in widening the viewing angle. A preferable optical film of the invention satisfies |Re|≦10 nm and | variation in the angle of the slow axis |≦2° or lower. A variation in the angle of the slow axis of 3° or lower described in the invention means that a difference in the angle of individual slow phase axes in the in-plane is within 3°.

It is more preferable that the optical film of the invention is 5 nm or less in Rth variation at a space measuring 1 m×1 m in terms of a stable development of the viewing angle characteristic. "5 nm or less in retardation value (Rt) variation in a space of 1 m×1 m" described in the invention means that when Rth of any samples of 1 m×1 m cut off from the film rolled after the film is determined at 100 locations, a variation in Rth is 5 nm or less.

For the determination of retardation values (Re and Rth) and the angle of slow axis according to the present invention, an automatic birefringence analyzer KOBRA-21ADH (made by Oji Scientific Instruments Co., Ltd.) is used to measure a 3-dimensional refractive index at a wavelength of 590 nm to obtain refractive indexes, nx, ny and nz.

The optical film of the invention is preferably 40 to 250 μm in thickness. A film having a thickness of 40 μm or more is easier to handle, and a film having a thickness of 250 μm or less has an improved surface quality and is easier to handle. The most preferable film thickness is 60 to 100 μm.

Optical film materials used in the invention shall not be restricted to any particular types of polymers and include various types of polymers, for example, cellulose esters such as a polyester film, a polyethylene film, a polypropylene film, cellophane, a cellulose diacetate film, a cellulose acetate propionate film, a cellulose acetate butylate film, a cellulose acetate phthalate film, a cellulose triacetate and a cellulose nitrate, or films prepared by their derivatives such as a polyvinylidene chloride film, a polyvinyl alcohol film, an ethylene vinyl alcohol film, a syndiotactic polystyrene film, a polycarbonate film, a norbornene resin film, a polymethylpentene film, a polyetherketone film, a polyethersulfone film, a polysulfone film, a polyetherketoneimide film, a polyamide film, a fluorocarbon polymer film, a nylon film, a polymethyl methacrylate film, an acryl film or a polyalylate film. Of these examples, preferable are a polycarbonate film, a cellulose triacetate and other cellulose esters having propionate group or butylate group in addition to acetyl group such as cellulose acetate propionate, cellulose acetate butylate and cellulose acetate propionate butylate. The group "propionate" includes n- and iso-propionate, and the group "butylate" includes n-, iso-, sec- and tert-butylate. Cellulose acetate propionate in which the percentage of propionate is relatively large is particularly useful as a film used in a liquid crystal display device because of improved water-resistance, mechanical strength and other preferable properties.

When used as a film material, a cellulose triacetate having a polymerization degree of 250 to 400 and combined acetic acid amount of 54 to 62.5% is preferable, and that having the combined acetic acid amount of 58 to 62.5% is greater in the base strength and more preferable. Cellulose triacetate synthesized from cotton linter or cellulose triacetate synthesized from wood pulp may be used solely or in combination of these to provide the cellulose triacetate of the invention. It is more preferable in raising the productivity to use cellulose triacetate synthesized from cotton linter in a larger quantity because of a better peeling property from a belt or a drum. Since the peeling property becomes greatly remarkable when the cellulose triacetate synthesized from cotton linter is contained with 60% or more by mass, a preferable content is 60% or more by mass and a more preferable content is 85% or more by mass. It is particularly preferable to use the cellulose triacetate solely.

It is preferable to mix a plasticizer with the film of the invention. There is no particular restriction to plasticizers usable in the invention and phosphate esters such as triphenylphosphate, tricresylphosphate, cresyldiphenylphosphate, octyldiphenylphosphate, diphenylbiphenylphosphate, trioctylphosphate and tributylphosphate, phthalate esters such as diethylphthalate, dimethoxyethylphthalate, dimethylphthalate, dioctylphthalate, dibutylphthalate and di-2-ethylhexylphthalate, glycolic acid esters such as triacetin, tributyrin, butylphthalyl butyglycolate, ethylphthalyl ethylglycolate, methylphthalyl ethylglycolate and butylphthalyl butylglycolate, which are preferably used solely or in combination. Plasticizers may be used solely or in combination with two or more types of these, whenever necessary. Where any plasticizer is used for cellulose ester, use of a phosphate ester plasticizer below 50% is preferable because hydrolysis of a cellulose ester film is unlikely to occur and is excellent in durability. It is more preferable to use a phosphate ester plasticizer at a smaller percentage, and it is particularly preferable to use a phthalate ester plasticizer or a glycolic acid ester plasticizer alone.

It is preferable to use ultraviolet absorbers in the film of the invention. Preferable ultraviolet absorbers are excellent in absorpotion capacity of ultraviolet rays of 380 nm or lower in wavelength in terms of prevention of liquid crystal deterioration and also having the least possible absorpotion capacity of visible light of 400 nm or higher in wavelength in terms of preferable liquid crystal display. The transmission efficiency at 380 nm in wavelength in particular must be 60% or lower, preferably 40% or lower and more preferably 20% or lower.

Ultraviolet absorbers include, for example, oxybenzophenone compounds, benzotriazole compounds, salicylic acid ester compounds, benzophenone compounds, cyanoacrylate compounds and nickel complex salt compounds, the present invention is not limited thereto.

It is preferable to use one or more types of these ultraviolet absorbers in the invention. Two or more types of different ultraviolet absorbers may be included.

Ultraviolet absorbers are added to a dope after dissolving it in an organic solvent such as alcohol, methylene chloride or dioxolan, or may be added directly into dope compositions. Inorganic powders which are not dissolved in an organic solvent may be added to a dope after dispersing it in cellulose ester together with an organic solvent by using a dissolver or a sand mill.

In the invention, ultraviolet absorbers are used in a quantity 0.1% to 2.5% by mass with respect to cellulose ester, preferably 0.5% to 2.0% by mass and more preferably 0.8% to 2.0% by mass.

It is also preferable to add fine particles such as silicon oxide as a matting agent to the film of the invention. In lowering the film haze, it is preferable that fine particles such as silicon oxide are subjected to surface treatment with organic substances. Organic substances preferably used in the surface treatment include halosilane, alkoxysilane, silazane and siloxane. Since fine particles with a larger mean diameter are greater in the matting effect and those with a smaller mean diameter are excellent in transparency, fine particles (primary particles) are preferably 5 to 50 nm in the mean diameter and more preferably 7 to 14 nm. Fine particles of silicon oxide include AEROSIL 200, 300, R972, R974, R202, R812, OX50 and TT600 (manufactured by Aerosil Co., Ltd.), and preferable are AEROSIL R972, R974, R202 and R812.

In order to prevent blocking or others in the winding process when the film of the invention is produced, both sides of the film are subjected to embossing. The embossing can process the film at any desired height, according to necessity, however, in the invention, in order to allow remaining solvents to volatilize after the winding process, the height is preferably set to 5 μm or more and more preferably 10 μm or more.

In general, films are additionally subjected to a wrapping process for preventing them from contamination or dust adherence due to static electricity in the period from wound into a roll to shipment. Wrapping materials are not particularly restricted as long as the above purposes are satisfied, and preferably materials which do not prevent remaining solvents from volatilizing from films. To be more specific, polyethylene, polyester, polypropylene, nylon, polystyrene, paper and various types of non-woven fabrics are given. Fabrics fibers which become mesh cross-like are more preferably used.

The conventionally known may be used for the polarizing plate of the invention. For example, a polarizing plate prepared by subjecting a film made of hydrophilic polymers such as polyvinyl alcohols for treatment with dichromatic dyes such as iodine and by stretching it or a polarizing plate prepared by subjecting a plastic film such as vinyl chlorides to an appropriate treatment and to orientation of polyene may be made available. The polarizing plate is structured as a lamination of protective films for at least either plane of the above polarizing film. Herein, the optical film of the invention may be structured to act also as a protective film, as explained above.

In the invention, in order to control Rth variation due to humidity and also obtain excellent viewing angle characteristics, the optical film and the polarizing plate of the invention (an optical film adhered on a polarizing film) are preferably 6% or lower in equilibrium moisture content, or films are more preferable of which the moisture content is 5% or lower, 4% or lower, 3% or lower, 2% or lower and 1% or lower accordingly. Particularly preferable equilibrium moisture content is substantially zero. In the present invention, "substantially zero" means 0.5% or lower.

[Optically Anisotropic Layer]

The optically anisotropic layer used in the liquid crystal display device of the invention will be explained in detail hereinafter. In the invention, the optically anisotropic layer contributes to eliminate the image coloration in the liquid crystal display device and to widen the viewing angle.

Further, components of the liquid crystal display device can be reduced by using the optical film on the optically anisotropic layer also acting as the protective film on the polarizing plate or using the optically anisotropic layer also acting as the protective film on the polarizing plate, thereby contributing to making the liquid crystal display device thinner in this embodiment.

In the present invention, an optically anisotropic layer consisting of discotic liquid crystal compounds may be combined with the optically monoaxial or biaxial optical film 3 consisting of macromolecule polymers to markedly improve the optical characteristics of the liquid crystal display device.

[Second Optically Anisotropic Layer]

The second optically anisotropic layer may be constituted of, for example, discotic liquid crystal compounds. More particularly, the second optically anisotropic layer contains at least one type of discotic liquid crystal compounds and compounds represented by the formulae (I), (II) and (III), having a negative refractive-index anisotropy, showing Re 10 nm or less, preferably −10 to 10 nm with respect to visible light, more preferably −5 to 5 nm and also showing Rth 30 to 250 nm, preferably 40 to 200 nm and more preferably 40 to 150 nm.

The discotic liquid crystal compounds are combined with at least one type of compounds represented by the formulae (I), (II) and (III), thereby making it possible to give a substantially horizontal (mean tilt angle ranging from 0 to 10 degrees) orientation to the polymer film plane. The discotic liquid crystal compounds that can be used in the invention include those described in various works of literature (C. Destrade et al. Mol. Crysr. Liq. Cryst., Vol. 71, page 111 (1981); compiled by the Chemical Society of Japan, Summary of Chemistry, a quarterly journal, No. 22, Chemistry of Liquid Crystal, Chapter 5, Chapter 10, Section 2 (1994); B. Kohne et al., Angew. Chem. Soc. Chem. Comm., page 1974 (1985); J. Zhang et al., J. Am. Chem. Soc., Vol. 116, page 2655 (1994). Polymerization of the discotic liquid crystal compounds that can be applied in the invention includes those described in JP-A-8-27284.

It is preferable that the discotic liquid crystal compounds are preferable to have a polymerization group so as to be fixed through polymerization. For example, a structure in which a polymerization group is allowed to bond with the disk-like core of the discotic liquid crystal compounds as a substituent. However, direct bonding of the polymerization group with the disk-like core makes it difficult to keep an orientation state during the polymerization reaction. It is, therefore, preferable to have a structure having a coupler between the disk-like core and the polymerization group. Namely, the discotic liquid crystal compound having the polymerization group is preferably a compound represented by the following formula (VI).

Formula (VI)

$D(-L-P)_n$, wherein D denotes disk-like core; L, a bivalent coupler; P, a polymerization group and n, an integer from 4 to 12.

Preferable examples of disk-like core (D), bivalent coupler (L) and polymerization group (P) in the formula (VI) are respectively (D1) to (D15), (L1) to (L25) and (P1) to (P18) described in JP-A-2001-4837, and the description of the patent publication may be preferably used in the invention. To be specific, refer to TE-8 shown below.

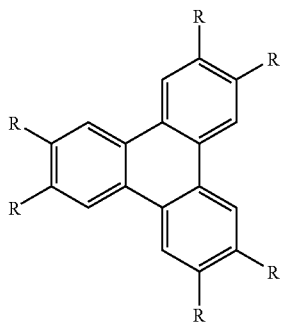

TE-8

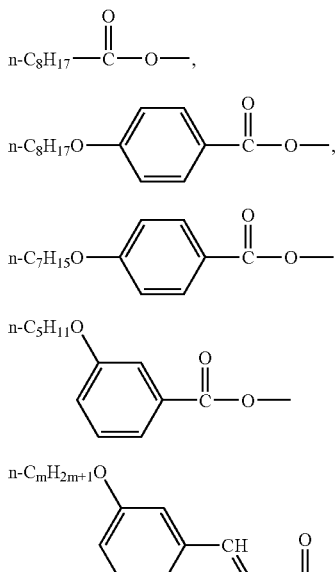

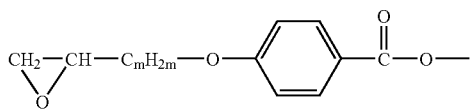

(m = an integer of 7 to 10)

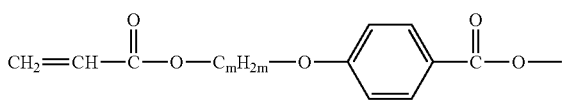

(m = an integer of 4 to 10)

It is also preferable to substantially horizontally orient discotic liquid crystal compounds having a polymerization group. "Substantially horizontal" means that the mean angle (mean tilt angle) of the disk plane of the discotic liquid crystal compounds with the plane of the optically anisotropic layer is in a range from 0° to 10°.

Preferable examples of the discotic liquid crystal compounds described in line 6, page 58 to line 8, page 65 in International Patent Publication No. W001/88574A1.

<<Horizontal Orientation Agent>>

Discotic liquid crystal compounds forming the optically anisotropic layer can be substantially horizontally oriented by combining at least one type of the compounds represented by the following formulae (I) to (III). Further, in the present invention, "horizontal orientation" means that the discotic liquid crystal compounds are parallel in the direction of its longitudinal axis to the horizontal plane of the liquid crystal layer (for example, the surface of an optical film where a liquid crystal layer is formed on the optical film) but does not mean that these compounds must strictly be parallel and a tilt angle formed between the disk plane of the core and the horizontal plane is orientation of less than 10 degrees in the description. The tilt angle is preferably 5° or lower, more preferably 3° or lower, more further preferably 2° and most preferably 1° or lower.

Formula (I)

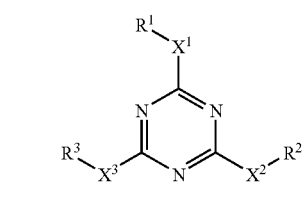

In the above formula, $R^1$, $R^2$ and $R^3$ denote independently a hydrogen atom or a substituent, and $X^1$, $X^2$ and $X^3$ denote a single bond or bivalent coupler.

Formula (II)

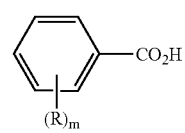

In the above formula, R denotes a substituent and m denotes an integer 0 to 5. Where m denotes an integer of 2 or more, a plurality of Rs may be the same or mutually different.

Formula (III)

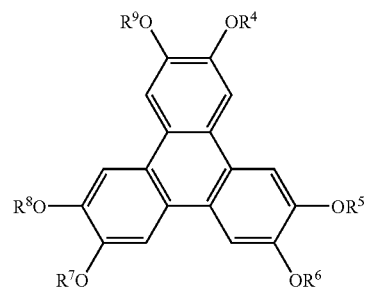

In the above formula, $R^4$, $R^5$, $R^6$, $R^7$, $R^8$ and $R^9$ denote independently a hydrogen atom or a substituent.

Hereinafter, a more detailed explanation will be made for the compounds represented by the formulae from (I) to (III). First, compounds represented by the formula (I) will be explained.

Substituents represented respectively by $R^1$, $R^2$ and $R^3$ include an alkyl group (preferably an alkyl group having a carbon number of 1 to 40, more preferably that having a carbon number of 1 to 30 and particularly preferably that having a carbon number of 1 to 20, for example, a methyl group, ethyl group, isopropyl group, tert-butyl group, n-octyl group, n-decyl group, n-hexadecyl group, cyclopropyl group, cyclopentyl group and cyclohexyl group), an alkenyl group (preferably alkenyl group having a carbon number of 2 to 40, more preferably that having a carbon number of 2 to 30 and particularly preferably that having a carbon number of 2 to 20, for example, vinyl group, allyl group, 2-butenyl group, 3-pentenyl group), an alkynyl group (preferably an alkynyl group having a carbon number of 2 to 40, more preferably that having a carbon number of 2 to 30 and particularly preferably that having a carbon number of 2 to 20, for example, a propalgyl group and 3-pentinyl group), an aryl group (preferably an aryl group having a carbon number of 6 to 30, more preferably that having a carbon number of 6 to 20 and particularly preferably that having a carbon number of 6 to 12, for example, a phenyl group, p-methyl phenyl group and naphthyl group) and a substituted or unsubstituted amino group (preferably an amino group having a carbon number of 0 to 40, more preferably that having a carbon number of 0 to 30 and particularly preferably that having a carbon number of 0 to 20, for example, an unsubstituted amino group, methyl amino group, dimethyl amino group, diethyl amino group and anilino group).

The above substituents also include an alkoxy group (preferably an alkoxy group having a carbon number of 1 to 40, more preferably that having a carbon number of 1 to 30 and particularly preferably that having a carbon number of 1 to 20, for example, a methoxy group, ethoxy group and butoxy group), an aryloxy group (preferably an aryloxy group having a carbon number of 6 to 40, more preferably, that having a carbon number of 6 to 30 and particularly preferably that having a carbon number of 6 to 20, for example, a phenyloxy group and 2-naphthyloxy group), an acyl group (preferably an acyl group having a carbon number of 1 to 40, more preferably that having a carbon number of 1 to 30 and particularly preferably that having a carbon number of 1 to 20, for example, an acetyl group, benzoyl group, formyl group and pivaroyl group), an alkoxycarbonyl group (preferably an alkoxycarbonyl group having a carbon number of 2 to 40, more preferably that having a carbon number of 2 to 30 and particularly preferably that having a carbon number of 2 to 20, for example, a methoxycarbonyl group and ethoxycarbonyl group), an aryloxycarbonyl group (preferably an aryloxycarbonyl group having a carbon number of 7 to 40, more preferably that having a carbon number of 7 to 30 and particularly preferably that having a carbon number of 7 to 20, for example, a phenyloxy carbonyl group), and an acyloxy group (preferably an acyloxy group having a carbon number of 2 to 40, more preferably that having a carbon number of 2 to 30 and particularly preferably that having a carbon number of 2 to 20, for example, an acetoxy group and benzoyloxy group).

Further, the above substituents also include an acylamino group (preferably an acylamino group having a carbon number of 2 to 40, more preferably that having a carbon number of 2 to 30 and particularly preferably that having a carbon number of 2 to 20, for example, an acetyl amino group and benzoyl amino group), an alkoxycarbonyl amino group (preferably an alkoxycarbonyl amino group having a carbon number of 2 to 40, more preferably that having a carbon number of 2 to 30 and particularly preferably that having a carbon number of 2 to 20, for example, a methoxycarbonyl amino group), an aryloxycarbonyl amino group (preferably an aryloxycarbonyl amino group having a carbon number of 7 to 40, more preferably that having a carbon number of 7 to 30 and particularly preferably that having a carbon number of 7 to 20, for example, a phenyloxycarbonyl amino group), sulfonyl amino group (preferably a sulfonyl amino group having a carbon number of 1 to 40, more preferably that having a carbon number of 1 to 30 and particularly preferably that having a carbon number of 1 to 20, for example, a methane sulfonyl amino group and benzene sulfonyl amino group), a sulfamoyl group (preferably a sulfamoyl group having a carbon number of 0 to 40, more preferably that having a carbon number of 0 to 30 and particularly preferably that having a carbon number of 0 to 20, for example, a sulfamoyl group, methyl sulfamoyl group, dimethyl sulfamoyl group and phenylsulfamoyl group), a carbamoyl group (preferably a carbamoyl group having a carbon number of 1 to 40, more preferably that having a carbon number of 1 to 30 and particularly preferably that having a carbon number of 1 to 20, for example, an unsubstituted carbamoyl group, methyl carbamoyl group, diethylcarbamoyl group and phenylcarbamoyl group).

In addition, the above substituents also include an alkylthio group (preferably an alkylthio group having a carbon number of 1 to 40, more preferably that having a carbon number of 1 to 30 and particularly preferably that having a carbon number of 1 to 20, for example, a phenylthio group), a sulfonyl group (preferably a sulfonyl group having a carbon number of 1 to 40, more preferably that having a carbon number of 1 to 30 and particularly preferably that having a carbon number of 1 to 20, for example, a methyl group and tosyl group), a sulfinyl group (preferably a sulfinyl group having a carbon number of 1 to 40, more preferably that having a carbon number of 1 to 30 and particularly preferably that having a carbon number of 1 to 20, for example, a methane sulfinyl group and benzene sulfinyl group), a ureide group (preferably a ureide group having a carbon number of 1 to 40, more preferably that having a carbon number of 1 to 30 and particularly preferably that having a carbon number of 1 to 20, for example, an unsubstituted ureide group, methyl ureide group and phenyl ureide group), a phosphate amide group (preferably a phosphate amide group having a carbon number of 1 to 40, more preferably that having a carbon number of 1 to 30 and particularly preferably that having a carbon number of 1 to 20, for example, a diethylphosphate amide group and phenyl phosphate amide group), a hydroxy group, mercapto group, halogen atom (for example, a fluorine atom, chlorine atom, bromine atom and iodine atom), a cyano group, sulfo group, carboxyl group, nitro group, hydroximic acid group, sulfino group, hydrazino group, imino group, heterocycle group (preferably a heterocycle group having a carbon number of 1 to 30, more preferably that having a carbon number of 1 to 12, for example, a heterocycle group having a nitrogen atom, oxygen atom, sulfur atom and others, for example, an imidazolyl group, pyridyl group, quinolyl group, furyl group, piperidyl group, morpholino group, benzooxazolyl group, benzimidazolyl group, benzthiazolyl group and 1,3,5-triazyl group), a silyl group (preferably a silyl group having a carbon number of 3 to 40, more preferably that having a carbon number of 3 to 30 and particularly preferably that having a carbon number of 3 to 24, for example, a trimethylsilyl group and triphenylsilyl group). These substituents may be further substituted by their substituents. In addition, where they have two or more substituents, such substituents may be the same or different. Where possible, these substituents may bond with each other to form a ring.

Preferable substituents respectively represented by $R^1$, $R^2$ and $R^3$ include an alkyl group, aryl group, substituted or unsubstituted amino group, alkoxy group, alkylthio group and hologen atom.

Bivalent couplers represented by $X^1$, $X^2$ and $X^3$ are preferably bivalent couplers selected from an alkylene group, alkenylene group, bivalent aromatic group, bivalent heterocycler residue, —CO—, —$NR^a$— ($R^a$ is an alkyl group or hydrogen atom having a carbon number of 1 to 5), —O—, —S—, —SO—, —$SO_2$— or from their combinations. The bivalent couplers are preferably groups having at least two combinations of bivalent couplers selected from an alkylene group, phenylene group, —CO—, —$NR^a$—, —O—, —S—, —$SO_2$— or from a group of these substances. The carbon atom number of an alkylene group is preferably 1 to 12. The carbon atom number of alkenylene group is preferably 2 to 12. The carbon atom number of a bivalent aromatic group is preferably 6 to 10. An alkylene group, alkenylene group and bivalent aromatic group may be substituted, if possible, by the groups explained as substituents represented by $R^1$, $R^2$ and $R^3$ (for example, an alkyl group, halogen atom, cyano group, alkoxy group and acyloxy group).

Of the compounds represented by the formula (I), compounds represented by the following formula (1a) or (1b) are particularly preferable.

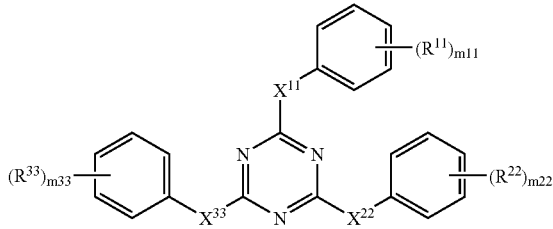

Formula (1a)

In the above formula, $R^{11}$, $R^{22}$ and $R^{33}$ denote a hydrogen atom or a substituent, $X^{11}$, $X^{22}$ and $X^{33}$ denote —NH—, —O— and —S—, and $m_{11}$, $m_{22}$ and $m_{33}$ denote an integer of 1 to 3.

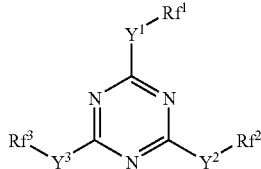

Formula (1b)

In the above formula, $Rf^1$, $Rf^2$ and $Rf^3$ denote an alkyl group having a $CF^3$ group or $CF^2H$ group at the end, $Y^1$, $Y^2$ and $Y^3$ denote a group combined by at least two bivalent couplers selected from an alkylene group, —CO—, —NH—, —O—, —S—, —$SO_2$— and a group consisting of these groups.

First, the compounds represented by the formula (1a) will be explained.

Substituents respectively represented by $R^{11}$ $R^{22}$ and $R^{33}$ are synonymous with those represented by the formula (I), $R^1$, $R^2$ and $R^3$, and the preferable range is also the same. Particularly preferable substituents represented respectively by $R^{11}$ $R^{22}$ and $R^{33}$ are alkoxy groups having a $CF^3$ group or $CF^2H$ group at the end, and they may be straight chained or branch chained. Alkoxy groups having a carbon number of 4 to 20 are preferable, those having a carbon number of 4 to 16 are more preferable and those having a carbon number of 6 to 16 are particularly preferable. The foregoing alkoxy groups having a $CF^3$ group or $CF^2H$ group at the end are alkoxy groups in which hydrogen atom contained in alkoxy group is partially or totally substituted with fluorine atom. More particularly, those in which 50% or more of a hydrogen atom contained in alkoxy group is substituted with a fluorine atom are preferable, those in which 60% or more of a hydrogen atom is substituted with fluorine atom are more preferable, and those in which 70% or more is substituted are particularly preferable. An alkoxy group represented by $R^{11}$, $R^{22}$ and $R_{33}$ and having a $CF_3$ group or $CF_2H$ group will be shown hereinafter.

R1: n-$C_8F_{17}$—O—

R2: n-$C_6F_{13}$—O—

R3: n-$C_4F_9$—O—

R4: n-$C_8F_{17}$—$(CH_2)_2$—O—$(CH_2)_2$—O—

R5: n-$C_6F_{13}$—$(CH_2)_2$—O—$(CH_2)_2$—O—

R6: n-$C_4F_9$—$(CH_2)_2$—O—$(CH_2)_2$—O—

R7: n-$C_8F_{17}$—$(CH_2)_3$—O—

R8: n-$C_6F_{13}$—$(CH_2)_3$—O—

R9: n-$C_4F_9$—$(CH_2)_3$—O—

R10: H—$(CF_2)_8$—O—

R11: H—$(CF_2)_6$—O—

R12: H—$(CF_2)_4$—O—

R13: H—$(CF_2)_8$—$(CH_2)$—O—

R14: H—$(CF_2)_6$—$(CH_2)$—O—

R15: H—$(CF_2)_4$—$(CH_2)$—O—

R16: H—$(CF_2)_8$—$(CH_2)$—O—$(CH_2)_2$—O—

R17: H—$(CF_2)_6$—$(CH_2)$—O—$(CH_2)_2$—O—

R18: H—$(CF_2)_4$—$(CH_2)$—O—$(CH_2)_2$—O—

$X^{11}$, $X^{22}$ and $X^{33}$ denote preferably —NH— or —O— and most preferably —NH—. $m^{11}$, $m^{22}$ and $m^{33}$ are preferably 2.

Next, the compounds represented by the formula (1b) will be explained.

Alkyl groups represented by $Rf^1$, $Rf^2$ and $Rf^3$ and having a $CF_3$ group or $CF_2H$ group at the end are substituted or unsubstituted alkyl groups, and these may be straight-chained or branch-chained. Alkyl groups having a carbon number of 4 to 20 are preferable, those having a carbon number of 4 to 16 are more preferable and those having a carbon number of 6 to 16 are particularly preferable. The foregoing alkyl groups having a $CF^3$ group or $CF^2H$ group at the end are alkyl groups in which ha ydrogen atom contained in an alkyl group is partially or totally substituted with fluorine atom. More particularly, those in which 50% or more of hydrogen atom contained in an alkyl group is substituted with a fluorine atom are preferable, those in which 60% or more of a hydrogen is substituted with a fluorine atom are more preferable, and those in which 70% or more is substituted are particularly preferable. An alkyl group represented by $Rf^1$, $Rf^2$ and $Rf^3$ and having a $CF_3$ group or $CF_2H$ group at the end will be explained hereinafter.

Rf1: $n\text{-}C_8F_{17}$—

Rf2: $n\text{-}C_6F_{13}$—

Rf3: $n\text{-}C_4F_9$—

Rf4: $n\text{-}C_8F_{17}\text{—}(CH_2)_2$—

Rf5: $n\text{-}C_6F_{13}\text{—}(CH_2)_2$—

Rf6: $n\text{-}C_4F_9\text{—}(CH_2)_2$—

Rf7: $H\text{—}(CF_2)_8$—

Rf8: $H\text{—}(CF_2)_6$—

Rf9: $H\text{—}(CF_2)_4$—

Rf10: $H\text{—}(CF_2)_8\text{—}(CH_2)$—

Rf11: $H\text{—}(CF_2)_6\text{—}(CH_2)$—

Rf12: $H\text{—}(CF_2)_4\text{—}(CH_2)$—

$Y_1$, $Y_2$ and $Y_3$ denote preferably groups combined by at least two bivalent couplers selected from an alkylene group, —NH—, —O—, —S— and a group consisting of these, more preferably those combined by at least two bivalent couplers selected from an alkylene group, —NH—, —O—, and a group consisting of these, and most preferably —NH—, —O—, —NH(CH$_2$)$_n$—O— (n denotes an integer of 1 to 8 and 3 is most preferable, which bonds with an triazine ring with a nitrogen atom).

Next, the compounds represented by the formula (II) will be explained.

Substituents represented by R are synonymous with the substituents represented by $R^1$, $R^2$ and $R^3$ in the formula (I) and the preferable range is also the same. m denotes preferably an integer of 1 to 3, and particularly preferably 2 or 3.

Of the compounds represented by the formula (II), particularly preferable are the compounds represented by the following formula (IIa).

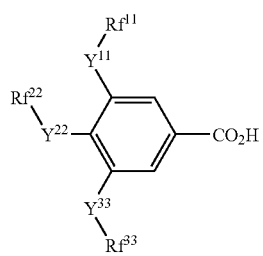

Formula (IIa)

In the above formula, $Rf^{11}$, $Rf^{22}$ and $Rf^{33}$, respectively, denote alkyl groups having a $CF_3$ group or $CF_2H$ group at the end, and $Y^{11}$, $Y^{22}$ and $Y^{33}$ denote groups combined by at least two bivalent couplers selected from an alkylene group, —CO—, —NH—, —O—, —S—, —SO$_2$— and a group consisting of these.

Alkyl groups represented by $Rf^{11}$, $Rf^{22}$ and $Rf^{33}$ having a $CF_3$ group or $CF_2H$ group at the end are synonymous with alkyl groups represented by $Rf^1$, $Rf^2$ and $Rf^3$ in the formula (1b) and having a $CF_3$ group or $CF_2H$ group at the end and the preferable range is also the same. $Y^{11}$, $Y^{22}$ and $Y^{33}$ are synonymous with $Y^1$, $Y^2$ and $Y^3$ in the formula (1b) and the preferable range is also the same. Most preferable are groups having a combination of at least two bivalent couplers selected from an alkylene group, —O— and a group consisting of these.

Finally, the compounds represented by the formula (III) will be explained.

Of substituents given as substituents represented by $R^1$, $R^2$ and $R^3$ in the formula (I), substituents represented respectively by $R^4$, $R^5$, $R^6$, $R^7$, $R^8$ and $R^9$ denote an alkyl group, alkenyl group, alkynyl group, aryl group, substituted or unsubstituted amino group, acyl group, alkoxycarbonyl group, aryloxy carbonyl group, acylamino group, alkoxycarbonylamino group, aryloxy carbonylamino group, sulfonyl amino group, sulfamoyl group, carbamoyl group, sulfonyl group, heterocycle group, and silyl group, and the preferable range is also the same.

Of the compounds represented by the formula (III), the following compounds represented by the formula (IIIa) are particularly preferable.

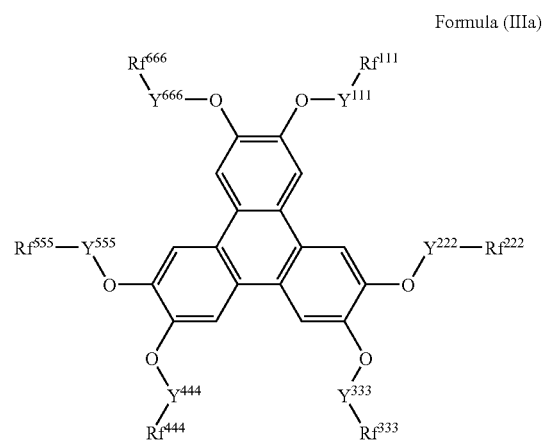

Formula (IIIa)

In the above formula, $Rf^{111}$, $Rf^{222}$, $Rf^{333}$, $Rf^{444}$, $Rf^{555}$ and $Rf^{666}$, respectively, denote alkyl groups having a $CF_3$ group or $CF_2H$ group at the end, and $Y^{111}$, $Y^{222}$, $Y^{333}$, $Y^{444}$, $Y^{555}$ and $Y^{666}$, respectively, denote groups combined by at least two bivalent couplers selected from an alkylene group, —CO—, —NH—, —O—, —S—, —SO$_2$— and a group consisting of these.

Alkyl groups represented by $Rf^{111}$, $Rf^{222}$, $Rf^{333}$, $Rf^{444}$, $Rf^{555}$ and $Rf^{666}$ and having a $CF_3$ group or a $CF_2H$ group at the end are synonymous with alkyl groups represented by $Rf^1$, $Rf^2$ and $Rf^3$ in the formula (1b) and having $CF_3$ group or $CF_2H$ group at the end and also the same in preferable range. Most preferable $Y^{111}$, $Y^{222}$, $Y^{333}$, $Y^{444}$, $Y^{555}$ and $Y^{666}$ are bivalent couplers consisting of an alkylene group, —O— and their combinations.

The following are examples of the compounds represented by the formulae (I), (II) and (III), however, the compounds used in the invention shall not be limited thereto. Of the following examples, No. I-1 to 39 are compounds represented by the formula (I), No. I-40 to 50 are compounds represented by the formula (II) and No. I-51 to 59 are compounds represented by the formula (III).

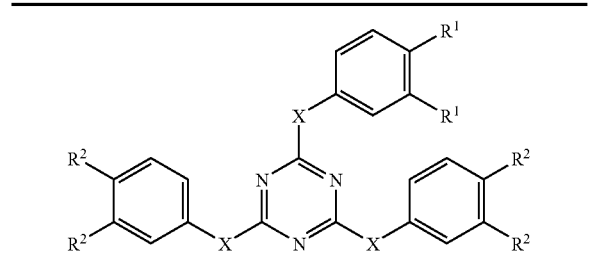

| Compound No. | R₁ | R₂ | X |
|---|---|---|---|
| I-1 | O(CH$_2$)$_3$(CF$_2$)$_4$F | O(CH$_2$)$_3$(CF$_2$)$_4$F | NH |
| I-2 | O(CH$_2$)$_3$(CF$_2$)$_6$F | O(CH$_2$)$_3$(CF$_2$)$_6$F | NH |
| I-3 | O(CH$_2$)$_3$(CF$_2$)$_8$F | O(CH$_2$)$_3$(CF$_2$)$_8$F | NH |
| I-4 | OCH$_2$(CF$_2$)$_6$H | OCH$_2$(CF$_2$)$_6$H | NH |
| I-5 | OCH$_2$(CF$_2$)$_8$H | OCH$_2$(CF$_2$)$_8$H | NH |
| I-6 | O(CH$_2$)$_2$O(CH$_2$)$_2$(CF$_2$)$_6$F | O(CH$_2$)$_2$O(CH$_2$)$_2$(CF$_2$)$_6$F | NH |
| I-7 | O(CH$_2$)$_2$O(CH$_2$)$_2$(CF$_2$)$_4$F | O(CH$_2$)$_2$O(CH$_2$)$_2$(CF$_2$)$_4$F | NH |
| I-8 | O(CH$_2$)$_3$S(CH$_2$)$_2$(CF$_2$)$_4$F | O(CH$_2$)$_3$S(CH$_2$)$_2$(CF$_2$)$_6$F | NH |
| I-9 | O(CH$_2$)$_3$S(CH$_2$)$_2$(CF$_2$)$_4$F | O(CH$_2$)$_3$S(CH$_2$)$_2$(CF$_2$)$_4$F | NH |
| I-10 | O(CH$_2$)$_6$S(CH$_2$)$_2$(CF$_2$)$_6$F | O(CH$_2$)$_6$S(CH$_2$)$_2$(CF$_2$)$_6$F | NH |
| I-11 | O(CH$_2$)$_6$S(CH$_2$)$_2$(CF$_2$)$_4$F | O(CH$_2$)$_6$S(CH$_2$)$_2$(CF$_2$)$_4$F | NH |
| I-12 | OC$_{10}$H$_{21}$ | OC$_{10}$H$_{21}$ | NH |
| I-13 | OC$_{12}$H$_{25}$ | OC$_{12}$H$_{25}$ | NH |
| I-14 | OC$_8$H$_{17}$ | OC$_{12}$H$_{25}$ | NH |
| I-15 | OC$_{16}$H$_{33}$ | OC$_{12}$H$_{25}$ | NH |
| I-16 | OC$_{12}$H$_{25}$ | OC$_{16}$H$_{33}$ | NH |
| I-17 | O(CH$_2$)$_2$O(CH$_2$)(CF$_2$)$_6$H | O(CH$_2$)$_2$O(CH$_2$)(CF$_2$)$_6$H | NH |
| I-18 | O(CH$_2$)$_3$(CF$_2$)$_6$F | O(CH$_2$)$_3$(CF$_2$)$_6$F | O |
| I-19 | OCH$_2$(CF$_2$)$_6$H | OCH$_2$(CF$_2$)$_6$H | O |
| I-20 | O(CH$_2$)$_2$O(CH$_2$)$_2$(CF$_2$)$_6$F | O(CH$_2$)$_2$O(CH$_2$)$_2$(CF$_2$)$_6$F | O |
| I-21 | O(CH$_2$)$_3$S(CH$_2$)$_2$(CF$_2$)$_6$F | O(CH$_2$)$_3$S(CH$_2$)$_2$(CF$_2$)$_6$F | O |
| I-22 | O(CH$_2$)$_2$O(CH$_2$)(CF$_2$)$_6$H | O(CH$_2$)$_2$O(CH$_2$)(CF$_2$)$_6$H | O |
| I-23 | O(CH$_2$)$_3$(CF$_2$)$_6$F | O(CH$_2$)$_3$(CF$_2$)$_6$F | S |
| I-24 | OCH$_2$(CF$_2$)$_6$H | OCH$_2$(CF$_2$)$_6$H | S |
| I-25 | O(CH$_2$)$_2$O(CH$_2$)$_2$(CF$_2$)$_6$F | O(CH$_2$)$_2$O(CH$_2$)$_2$(CF$_2$)$_6$F | S |
| I-26 | O(CH$_2$)$_3$S(CH$_2$)$_2$(CF$_2$)$_6$F | O(CH$_2$)$_3$S(CH$_2$)$_2$(CF$_2$)$_6$F | S |
| I-27 | O(CH$_2$)$_2$O(CH$_2$)(CF$_2$)$_6$H | O(CH$_2$)$_2$O(CH$_2$)(CF$_2$)$_6$H | S |

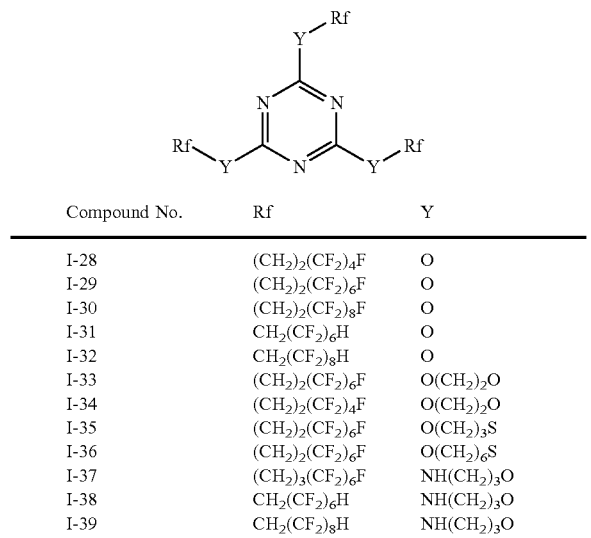

| Compound No. | Rf | Y |
|---|---|---|
| I-28 | (CH$_2$)$_2$(CF$_2$)$_4$F | O |
| I-29 | (CH$_2$)$_2$(CF$_2$)$_6$F | O |
| I-30 | (CH$_2$)$_2$(CF$_2$)$_8$F | O |
| I-31 | CH$_2$(CF$_2$)$_6$H | O |
| I-32 | CH$_2$(CF$_2$)$_8$H | O |
| I-33 | (CH$_2$)$_2$(CF$_2$)$_6$F | O(CH$_2$)$_2$O |
| I-34 | (CH$_2$)$_2$(CF$_2$)$_4$F | O(CH$_2$)$_2$O |
| I-35 | (CH$_2$)$_2$(CF$_2$)$_6$F | O(CH$_2$)$_3$S |
| I-36 | (CH$_2$)$_2$(CF$_2$)$_6$F | O(CH$_2$)$_6$S |
| I-37 | (CH$_2$)$_3$(CF$_2$)$_6$F | NH(CH$_2$)$_3$O |
| I-38 | CH$_2$(CF$_2$)$_6$H | NH(CH$_2$)$_3$O |
| I-39 | CH$_2$(CF$_2$)$_8$H | NH(CH$_2$)$_3$O |

In the table, the left side of Y bonds with the triazine ring and the right side of Y bonds with the Rf.

| Compound No. | Rf | Y |
|---|---|---|
| I-40 | (CH$_2$)$_3$(CF$_2$)$_4$F | O |
| I-41 | (CH$_2$)$_3$(CF$_2$)$_6$F | O |
| I-42 | (CH$_2$)$_3$(CF$_2$)$_8$F | O |
| I-43 | CH$_2$(CF$_2$)$_6$H | O |
| I-44 | CH$_2$(CF$_2$)$_8$H | O |
| I-45 | (CH$_2$)$_2$(CF$_2$)$_6$F | O(CH$_2$)$_2$O |
| I-46 | (CH$_2$)$_2$(CF$_2$)$_4$F | O(CH$_2$)$_2$O |
| I-47 | (CH$_2$)$_2$(CF$_2$)$_6$F | O(CH$_2$)$_3$S |
| I-48 | (CH$_2$)$_2$(CF$_2$)$_6$F | O(CH$_2$)$_6$S |

In the table, the left side of Y bonds with the benzene ring and the right side of Y bonds with the Rf.

| Compound No. | Rf | Y |
|---|---|---|
| I-49 | (CH$_2$)$_3$(CF$_2$)$_6$F | O |
| I-50 | (CH$_2$)$_3$(CF$_2$)$_6$F | O(CH$_2$)$_2$O |

| Compound No. | Rf | Y |
|---|---|---|
| I-51 | (CF$_2$)$_4$F | (CH$_2$)$_3$ |
| I-52 | (CF$_2$)$_6$F | (CH$_2$)$_3$ |
| I-53 | (CF$_2$)$_8$F | (CH$_2$)$_3$ |
| I-54 | (CF$_2$)$_6$H | CH$_2$ |
| I-55 | (CF$_2$)$_8$H | CH$_2$ |
| I-56 | (CH$_2$)$_2$(CF$_2$)$_6$F | (CH$_2$)$_2$O |
| I-57 | (CH$_2$)$_2$(CF$_2$)$_4$F | (CH$_2$)$_2$O |
| I-58 | (CH$_2$)$_2$(CF$_2$)$_6$F | (CH$_2$)$_3$S |
| I-59 | (CH$_2$)$_2$(CF$_2$)$_6$F | (CH$_2$)$_6$S |

In the table, the left side of Y bonds with the oxygen atom and the right side of Y bonds with the Rf.

In the invention, the addition amount of the compounds represented by the formulae (I) to (III) are preferably at 0.01 to 20% by mass of a discotic liquid crystal compound, more preferably 0.05 to 10% by mass, and particularly preferably 0.1 to 5% by mass. Further, the compounds represented by the formulae (I) to (III) may be used solely or in combination with two or more types of these compounds.

<<Fluorine-Containing Polymer>>

In the invention, at least one fluorine-containing polymer may be used to improve the surface smoothness on the optically anisotropic layer. These are polymers which do not inhibit molecules of discotic liquid crystal compounds substantially horizontally orient (mean tilt angle in a range of 1 to 10°) to a layer flat surface. Preferable examples of fluorine-containing polymers usable in the invention are polymers which contain polymerization units of fluoro aliphatic group-containing monomers represented by the following formula (IX).

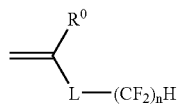

Formula (IX)

$R^0$ in the formula (IX) denotes a hydrogen atom, a halogen atom or a methyl group, more preferably, a hydrogen atom or a methyl group. L denotes a divalent coupler, preferably a divalent coupler selected from —O—, —S—, —CO—, —NR'—, —CO—NR'—, —CO—O—, an alkylene group, an alilene group or a group consisting of two or more these. The above $R^{10}$ denotes an alkyl group or a hydrogen atom having a carbon atom number of 1 to 8, preferably an alkyl group having a carbon number of 1 to 4, and more preferably a hydrogen atom or a methyl group. Regarding the alkylene group, that having a carbon atom number of 1 to 6 is preferable, that having the number of 1 to 4 is more preferable, and that having the number of 1 or 2 is particularly preferable, for example, a methylene, an ethylene and a trimethylene. Further, a straight-chained or a branch-chained alkylene group may be used in the invention. The foregoing alilene group having a carbon atom number of 6 to 20 is preferable, and that having a number of 6 to 10 is more preferable, for example, a phenylene and a naphthene. n denotes an integer of 1 or more or 18 or less, 2 to 12 are more preferable, 4 to 8 are still more preferable and 4 or 6 is most preferable.

Of fluoro aliphatic group-containing monomers represented by the formula (IX), monomers represented by the following formula (VI) are preferable.

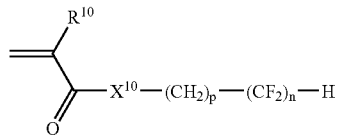

Formula (VI)

In the formula (VI), $R^{10}$ denotes a hydrogen atom, a halogen atom or a methyl group, more preferably, a hydrogen atom and a methyl group. $X^{10}$ denotes an oxygen atom, a sulfur atom or a —N($R^{11}$)—, preferably an oxygen atom and an N($R^{11}$)—, and further preferably an oxygen atom. $R^{11}$ denotes a hydrogen atom or an alkyl group having a carbon number of 1 to 8, preferably a hydrogen atom and an alkyl group having a carbon number of 1 to 4, and further preferably a hydrogen atom or a methyl group. p denotes an integer of 1 to 6, 1 to 3 is preferable and 1 is more preferable.

n denotes an integer of 1 to 18, 2 to 12 are preferable, 4 to 8 are more preferable and 4 or 6 is most preferable.

The following are examples of fluoro aliphatic group-containing monomers represented by the formulae (IX) and (VI), however, the invention is not limited thereto.

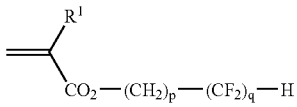

| | $R^1$ | p | q |
|---|---|---|---|
| F-1 | H | 1 | 4 |
| F-2 | $CH_3$ | 1 | 4 |
| F-3 | F | 1 | 4 |
| F-4 | H | 2 | 4 |
| F-5 | $CH_3$ | 3 | 4 |
| F-6 | H | 1 | 6 |
| F-7 | $CH_3$ | 1 | 6 |
| F-8 | F | 1 | 6 |
| F-9 | H | 2 | 6 |
| F-10 | $CH_3$ | 2 | 6 |
| F-11 | H | 3 | 6 |
| F-12 | H | 1 | 8 |
| F-13 | $CH_3$ | 1 | 8 |
| F-14 | F | 1 | 8 |
| F-15 | $CH_3$ | 2 | 8 |
| F-16 | H | 3 | 8 |
| F-17 | $CH_3$ | 3 | 8 |
| F-18 | H | 1 | 10 |
| F-19 | $CH_3$ | 1 | 10 |
| F-20 | F | 1 | 10 |
| F-21 | H | 2 | 10 |
| F-22 | H | 2 | 10 |
| F-23 | H | 1 | 12 |
| F-24 | $CH_3$ | 1 | 12 |
| F-25 | F | 1 | 12 |
| F-26 | H | 2 | 12 |
| F-27 | H | 3 | 12 |
| F-28 | H | 1 | 14 |
| F-29 | $CH_3$ | 1 | 14 |
| F-30 | F | 1 | 14 |
| F-3t | H | 2 | 14 |
| F-32 | $CH_3$ | 2 | 14 |
| F-33 | H | 1 | 16 |
| F-34 | $CH_3$ | 1 | 16 |
| F-35 | F | 1 | 16 |
| F-36 | $CH_3$ | 2 | 16 |
| F-37 | H | 3 | 16 |
| F-38 | H | 1 | 18 |
| F-39 | $CH_3$ | 1 | 18 |
| F-40 | F | 1 | 18 |
| F-41 | H | 3 | 18 |
| F-42 | $CH_3$ | 3 | 18 |

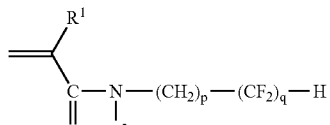

| | $R^1$ | $R^2$ | p | q |
|---|---|---|---|---|
| F-43 | H | H | 1 | 4 |
| F-44 | $CH_3$ | H | 1 | 4 |
| F-45 | H | $CH_3$ | 1 | 4 |
| F-46 | H | H | 2 | 4 |
| F-47 | H | H | 1 | 6 |
| F-48 | $CH_3$ | H | 1 | 6 |
| F-49 | H | $CH_3$ | 1 | 6 |
| F-50 | H | $C_2H_5$ | 1 | 6 |
| F-51 | $CH_3$ | H | 1 | 6 |
| F-52 | F | H | 2 | 6 |
| F-53 | H | H | 1 | 8 |
| F-54 | $CH_3$ | H | 1 | 8 |

-continued

| | | | | |
|---|---|---|---|---|
| F-55 | H | CH₃ | 1 | 8 |
| F-56 | H | C₄H₉(n) | 1 | 8 |
| F-57 | CH₃ | C₂H₅ | 1 | 8 |
| F-58 | H | CH₂Ph | 1 | 8 |
| F-59 | H | H | 2 | 8 |
| F-60 | CH₃ | H | 3 | 8 |
| F-61 | H | H | 1 | 10 |
| F-62 | CH₃ | CH₃ | 1 | 10 |
| F-63 | H | H | 1 | 12 |
| F-64 | CH₃ | H | 1 | 12 |
| F-65 | H | H | 1 | 18 |
| F-66 | H | CH₃ | 1 | 18 |

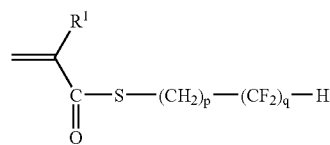

| | $R^1$ | p | q |
|---|---|---|---|
| F-67 | H | 1 | 4 |
| F-68 | CH₃ | 1 | 4 |
| F-69 | H | 2 | 4 |
| F-70 | H | 1 | 6 |
| F-71 | CH₃ | 1 | 6 |
| F-72 | CH₃ | 2 | 6 |
| F-73 | H | 1 | 8 |
| F-74 | CH₃ | 1 | 8 |
| F-75 | F | 1 | 8 |
| F-76 | H | 2 | 8 |
| F-77 | CH₃ | 3 | 8 |
| F-78 | H | 1 | 10 |
| F-79 | CH₃ | 1 | 10 |
| F-80 | H | 1 | 12 |
| F-81 | CH₃ | 1 | 12 |
| F-82 | H | 1 | 16 |
| F-83 | CH₃ | 2 | 16 |
| F-84 | H | 1 | 18 |
| F-85 | CH₃ | 1 | 18 |

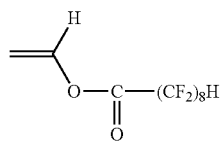

F-86

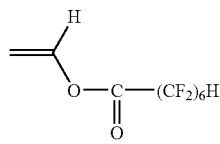

F-87

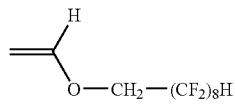

F-88

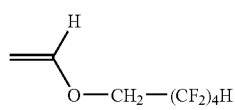

F-89

F-90

F-91

<br>

F-92

<br>

F-93

<br>

F-94

<br>

F-95

Preferable examples of fluorine-containing polymers usable in the invention are such polymers that contain a polymerization unit of fluoro aliphatic group-containing monomers represented by the formula (IX), or the content of which is 50% by mass or more with respect to the total polymerization units, preferably 60% by mass or greater and more preferably 70% by mass or greater. Said polymers may contain two or more fluoro aliphatic group-containing monomers represented by the formula (IX).

Other preferable examples of fluorine-containing polymers usable in the invention are polymers that contain fluoro aliphatic group-containing monomers represented by the formula (VI), or the content of which is 50% by mass or more with respect to the total polymerization unit, preferably 60% by mass or greater and more preferably 70% by mass or greater. Said polymers may contain two or more fluoro aliphatic group-containing monomers represented by the formula (VI).

In addition, preferable examples of fluorine-containing polymers usable in the invention are polymers that contain polymerization units of fluoro aliphatic group-containing monomers represented by the above formula (IX), and also the fluorine atom content of which is 25% or more (% by mass of a fluorine atom with respect to the total polymer mass), preferably 35% or more and 80% or less. Said polymers may contain two or more fluoro aliphatic group-containing monomers represented by the formula (IX).

Other preferable examples of fluorine-containing polymers usable in the invention are polymers that contain the polymerization unit of fluoro aliphatic group-containing monomers represented by the formula (VI) and also the fluorine atom content of which is 25% or more (% by mass of a fluorine atom with respect to the total polymer mass), preferably 35% or more and 80% or less. Said polymers may contain two or more fluoro aliphatic group-containing monomers represented by the formula (VI).

Fluorine-containing polymers usable in the invention may consist of only one type polymerization unit or two or more type monomers represented by the formula (IX) or (VI). Also usable in the invention are copolymers consisting of one type or two or more types of monomers represented by the formula (IX) or (VI) and one or more types of other monomers which can be copolymerized. Such other monomers which can be copolymerized include those described in the Polymer Handbook $2^{nd}$ ed., J. Brandrup, Wiley Interscience (1975) Chapter 2 page 1 to 483. For example, compounds containing one additive polymerization unsaturated bond selected from an acrylic acid, a methacrylic acid, acrylic acid esters, methacrylic acid esters, acrylamides, methacrylamides, aryl compounds, vinyl ethers, vinylesters and others.

To be more specific, the following monomers are included.

Acrylic esters;

a methyl acrylate, an ethyl acrylate, a propyl acrylate, a chloroethyl acrylate, a 2-hydroxyethyl acrylate, a trimethylolpropane monoacrylate, a benzyl acrylate, a methoxybenzyl acrylate, a furfuryl acrylate, a tetrahydrofurfuryl acrylate and others methacrylic esters;

a methyl methacrylate, an ethyl methacrylate, a propyl methacrylate, a chlorethyl methacrylate, a 2-hydroxyethyl methacrylate, a trimethylolpropane monomethacrylate, a benzyl methacrylate, a methoxybenzyl methacrylate, a furfuryl methacrylate, a tetrahydrofurfuryl a methacrylate and others.

Acryl amides;

an acryl amide, a N-alkylacrylamide (an alkyl group having a carbon number of 1 to 3, for example, a methyl group, an ethyl group and a propyl group), a N,N-dialkylacrylamide (an alkyl group having a carbon number of 1 to 6), a N-hydroxyethyl-N-methyl acryl amide, a N-2-acetamideethyl-N-acetyl acryl amide and others Methacrylamides;

a methacrylamide, a N-alkylmethacrylamide (an alkyl group having a carbon number of 1 to 3, for example, a methyl group, an ethyl group and a propyl group), N, a N-dialkylmethacrylamide (an alkyl group having a carbon number of 1 to 6), a N-hydroxyethyl-N-methyl methacrylamide, a N-2-acetamideethyl-N-acetyl methacrylamide and others allyl compounds;

allyl esters (for example, an allyl acetate, an allyl caproic acid, an allyl caprylic acid, an allyl lauric acid, an allyl palmitic acid, an allyl stearic acid, an allyl bezoic acid, an allyl acetacetic acid, an allyl lactic acid), an allyloxy ethanol and others.

Vinyl ethers;

an alkyl vinyl ether (for example, a hexylvinyl ether, an octylvinyl ether, a decylvinyl ether, an ethylhexylvinyl ether, a methoxyethylvinyl ether, an ethoxyethylvinyl ether, a chloroethylvinyl ether, a 1-methyl 2,2-dimethylpropylvinyl ether, a 2-ethylbutylvinyl ether, a hydroxyethylvinyl ether, a diethyleneglycolvinyl ether, a dimethyl aminoethylvinyl ether, a diethylaminoethylvinyl ether, a butylaminoethylvinyl ether, a benzylvinyl ether, a tetrahydrofurfurylvinyl ether, and others vinyl esters;

a vinylbutylate, a vinyl isobutylate, a vinyl trimethyl acetate, a vinyl diethylacetate, a vinyl valate, a vinyl caproate, a vinyl chloroacetate, a vinyl dichloroacetate, a vinyl methoxyacetate, a vinyl butoxyacetate, a vinyl lactate, a vinyl-β-phenylbutylate, a vinyl cyclohexyl carboxylate and others.

Dialkyl itaconates;

a dimethyl itaconate, a diethyl itaconate, a dibutyl itaconate and others a dialkylesters or a monoalkylesters of fumaric acid:

a dibutylfumarate and others a crotonic acid, an itaconic acid, an acrylonitrile, a methacrylonitrile, a malleironitrile, styrene and others.

Of the above substances, other preferable monomers include monomers represented by the following formula (VII).

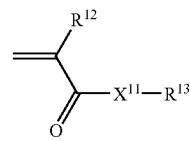

Formula (VII)

In the formula (VII), $R^{12}$ denotes a hydrogen atom, a halogen atom or a methyl group, more preferably, a halogen atom or a methyl group. $X^{11}$ denotes an oxygen atom, a sulfur atom or a $N(R^{14})$—, preferably, an oxygen atom or a —$N(R^{14})$—, and more preferably an oxygen atom. $R^{14}$ denotes a hydrogen atom or an alkyl group having a carbon number of 1 to 8, preferably a hydrogen atom or an alkyl group having a carbon number of 1 to 4 and more preferably a hydrogen atom or a methyl group. $R^{13}$ denotes a straight-chained, branch-chained or circular alkyl group with a carbon number of 1 to 20 which may have a substituent, an alkyl group containing a poly(alkyleneoxy) group or an aromatic group (for example, a phenyl group or a naphthyl group), which may have a substituent. A straight-chained, branch-chained or circular alkyl group having a carbon number of 1 to 12, or an aromatic group having the total carbon number of 6 to 18 is more preferable, and a straight-chained, branch-chained or circular alkyl group having a carbon number of 1 to 8 is still preferable. The above poly(alkyleneoxy) group will be explained hereinafter.

A poly(alkyleneoxy) group is represented by $(OR)_x$, and R is preferably an alkylene group having 2 to 4 carbon atoms, for example, —$CH_2CH_2$—, —$CH_2CH_2CH_2$—, —$CH(CH_3)CH_2$— or —$CH(CH_3)CH(CH_3)$—. Oxyalkylene units in the poly(oxyalkylene) group may be the same as in the case of the poly(oxypropylene) or those in which mutually different two or more types of oxy alkylene groups are distributed irregularly. Further, they may be straight-chained or branch-chained oxy propylene and oxy ethylene units, or may be available as a block of straight-chained or branch-chained oxypropylene units and a block of oxyethylene units. The poly (oxyalkylene) chains may include those joined together with one or more couplers (for example, —CONH-Ph-NHCO—, —S—: Ph denotes a phenylene group). Where the coupler has a trivalent or greater atomic value, branch-chained oxy alkylene units are obtained. Where a copolymer which contains polymerization units having a poly(oxyalkylene) group is used in the invention, the molecular weight of a poly(oxyalkylene) group of 250 to 3000 is appropriate.

Poly(oxyalkylene)acrylate and methacrylate wherein $X^{11}$ is an oxygen atom and $R^{13}$ is an alkyl group containing a poly (alkyleneoxy) group can be prepared by allowing commercially available hydroxy poly(oxyalkylene) materials, for example, "Pluronic," (made by Asahi Denka Co., Ltd.), Adecapolyether (by Asahi Denka Co., Ltd.), "Carbowax" (Glyco Products), "Toriton" (made by Rohm and Haas) and P.E.G. (Dai-Ichi Kogyo Seiyaku Co., Ltd.) to react with an acrylic acid, a methacrylic acid, an acrylic chloride, a methacrylic chloride, an anhydrous acrylic acid or others by any known method. In the invention, it is also possible to use a poly(oxyalkylene) diacrylate and others produced by any known method.

Examples of monomers represented by the formula (VII) include previously described acrylic acid esters, methacrylic acid esters, acrylamides, or examples of methacrylamides and those containing the following poly(alkyleneoxy) group, however, the invention is not limited thereto. Poly(alkyleneoxy) is often a mixture of two or more types different in the polymerization degree, and in compounds shown as concrete examples, the polymerization degree is indicated by an integer close to the mean polymerization degree.

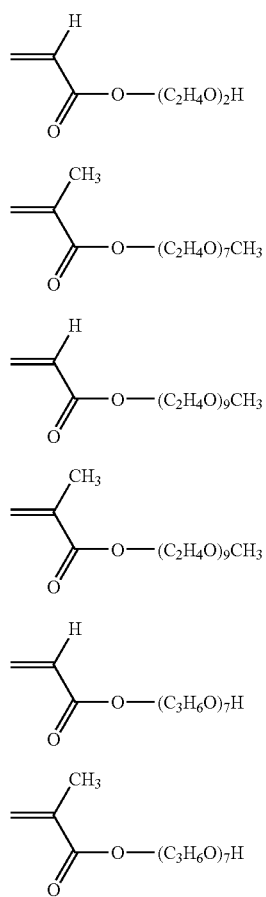
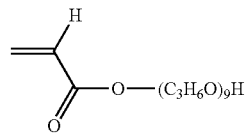
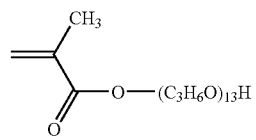
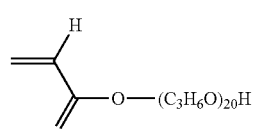
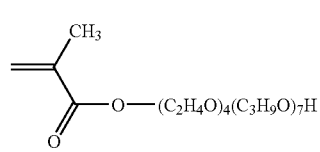

In the invention, fluorinated polymers having hydrogen atoms at the end of a fluoro aliphatic group are used, which are highly environmentally safe substances, therefore, they are advantageous in terms of industrial applicability.

Of the fluorine-containing polymers usable in the invention, polymerization units of monomers represented by the formula (VII) are preferably 50% by mass or less on the basis of the total polymerization unit constituting the fluorine-containing polymer, more preferably 0 and 30% by mass and more further preferably 0 and 20% by mass.

The higher content of a fluorine atom (% by mass of a fluorine atom with respect to the total mass of the polymer) of fluorine-containing polymers usable in the invention, the more the surface smoothness on the optically anisotropic layer is improved, therefore, this is more preferable. A fluorine atom content fluorine-containing polymer with a 25% by mass or more is preferable, and more preferably 35 and 80% by weight.

The mass-average molecular weight of fluorine-containing polymers usable in the invention are preferably 2,000 to 100,000, more preferably 3,000 to 80,000 and more further preferably 4,000 to 60,000. The mass-average molecular weight and the molecular weight are molecular weight converted on the basis of polystyrene conversion by a GPC (Gel Permeation Chromatography) using columns of TSK gel GMHxL, TSK gel G4000HxL and TSK gel G2000HxL (all available from Tosoh Corporation), solvent THF and differential refractometry.

Fluorine-containing polymers usable in the invention may be produced by known common methods. For example, these polymers may be produced by adding a radical polymerization starter for general use to monomers of the fluoro aliphatic group-containing (metha)acrylate, polyoxyalkylene group-containing (metha) acrylate and others in an organic solvent and subjecting them to polymerization. Alternatively, these polymers can be produced in similar procedures by addition of another additive-polymerization unsaturated compound. A method for dropping monomers and a starter into a reaction vessel, with the polymerization property of each monomer is effective to obtain polymers with a uniform composition.

The following is a specific structural example of fluorine-containing polymers usable in the invention, however, the invention is not limited thereto. In addition, numbers in P-113 to 130 denote the mass ratio of each monomer composition. Mw denotes a mass-average molecular weight.

$$-(CH_2-\underset{\underset{CO_2-CH_2-(CF_2)_n-H}{|}}{\overset{\overset{R}{|}}{C}})_{100}-$$

| | R | n | Mw |
|---|---|---|---|
| P-1 | H | 4 | 8000 |
| P-2 | H | 4 | 16000 |
| P-3 | H | 4 | 33000 |
| P-4 | $CH_3$ | 4 | 12000 |
| P-5 | $CH_3$ | 4 | 28000 |
| P-6 | H | 6 | 8000 |
| P-7 | H | 6 | 14000 |
| P-8 | H | 6 | 29000 |
| P-9 | $CH_3$ | 6 | 10000 |
| P-10 | $CH_3$ | 6 | 21000 |
| P-11 | H | 8 | 4000 |
| P-12 | H | 8 | 16000 |
| P-13 | H | 8 | 31000 |
| P-14 | $CH_3$ | 8 | 3000 |
| P-15 | H | 10 | 5000 |
| P-16 | $CH_3$ | 8 | 10000 |
| P-17 | $CH_3$ | 8 | 27000 |
| P-18 | H | 10 | 11000 |
| P-19 | $CH_3$ | 10 | 4500 |
| P-20 | $CH_3$ | 10 | 12000 |
| P-21 | H | 12 | 5000 |
| P-22 | H | 12 | 10000 |
| P-23 | $CH_3$ | 12 | 5500 |
| P-24 | $CH_3$ | 12 | 12000 |

$$-(CH_2-\underset{\underset{CO_2-(CH_2)_p-(CF_2)_q-H}{|}}{\overset{\overset{R^1}{|}}{C}})_x-(CH_2-\underset{\underset{CO_2-(CH_2)_r-(CF_2)_s-H}{|}}{\overset{\overset{R^2}{|}}{C}})_{100-x}-$$

| | x | $R^1$ | p | q | $R^2$ | r | s | Mw |
|---|---|---|---|---|---|---|---|---|
| P-25 | 50 | H | 1 | 4 | $CH_3$ | 1 | 4 | 10000 |
| P-26 | 40 | H | 1 | 4 | H | 1 | 6 | 14000 |
| P-27 | 60 | H | 1 | 4 | $CH_3$ | 1 | 6 | 21000 |
| P-28 | 10 | H | 1 | 4 | H | 1 | 8 | 11000 |
| P-29 | 40 | H | 1 | 4 | H | 1 | 8 | 16000 |
| P-30 | 20 | H | 1 | 4 | $CH_3$ | 1 | 8 | 8000 |
| P-31 | 10 | $CH_3$ | 1 | 4 | $CH_3$ | 1 | 8 | 7000 |
| P-32 | 50 | H | 1 | 6 | $CH_3$ | 1 | 6 | 12000 |
| P-33 | 50 | H | 1 | 6 | $CH_3$ | 1 | 6 | 22000 |
| P-34 | 30 | H | 1 | 6 | $CH_3$ | 1 | 6 | 5000 |
| P-35 | 40 | $CH_3$ | 1 | 6 | H | 3 | 6 | 3000 |
| P-36 | 10 | H | 1 | 6 | H | 1 | 8 | 7000 |
| P-37 | 30 | H | 1 | 6 | H | 1 | 8 | 17000 |
| P-38 | 50 | H | 1 | 6 | H | 1 | 8 | 16000 |
| P-39 | 50 | $CH_3$ | 1 | 6 | H | 3 | 8 | 19000 |
| P-40 | 50 | H | 1 | 8 | $CH_3$ | 1 | 8 | 5000 |
| P-41 | 80 | H | 1 | 8 | $CH_3$ | 1 | 8 | 10000 |
| P-42 | 50 | $CH_3$ | 1 | 8 | H | 3 | 8 | 14000 |
| P-43 | 90 | H | 1 | 8 | $CH_3$ | 3 | 8 | 9000 |
| P-44 | 70 | H | 1 | 8 | H | 1 | 10 | 7000 |
| P-45 | 90 | H | 1 | 8 | H | 3 | 10 | 12000 |
| P-46 | 50 | H | 1 | 8 | H | 1 | 12 | 10000 |
| P-47 | 70 | H | 1 | 8 | $CH_3$ | 3 | 12 | 8000 |

-continued

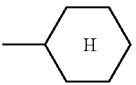

| | x | R¹ | n | R² | R³ | Mw |
|---|---|---|---|---|---|---|
| P-48 | 80 | H | 4 | $CH_3$ | $CH_3$ | 11000 |
| P-49 | 90 | H | 4 | H | $C_4H_9(n)$ | 7000 |
| P-50 | 95 | H | 4 | H | $C_6H_{13}(n)$ | 5000 |
| P-51 | 90 | $CH_3$ | 4 | H | $CH_2CH(C_2H_5)C_4H_9(n)$ | 15000 |
| P-52 | 70 | H | 6 | $CH_3$ | $C_2H_5$ | 18000 |
| P-53 | 90 | H | 6 | $CH_3$ | cyclohexyl | 12000 |
| P-54 | 80 | H | 6 | H | $C_4H_9(sec)$ | 9000 |
| P-55 | 90 | H | 6 | H | $CH_2CH_2OC_2H_5$ | 14000 |
| P-56 | 60 | $CH_3$ | 6 | $CH_3$ | $CH_3$ | 15000 |
| P-57 | 60 | H | 8 | H | $CH_3$ | 10000 |
| P-58 | 70 | H | 8 | H | $C_2H_5$ | 24000 |
| P-59 | 70 | H | 8 | H | $C_4H_9(n)$ | 5000 |
| P-60 | 50 | H | 8 | H | $C_4H_9(n)$ | 16000 |
| P-61 | 80 | H | 8 | $CH_3$ | $C_4H_9(iso)$ | 13000 |
| P-62 | 80 | H | 8 | $CH_3$ | $C_4H_9(t)$ | 9000 |
| P-63 | 60 | H | 8 | H | cyclohexyl | 7000 |
| P-64 | 80 | H | 8 | H | $CH_2CH(C_2H_5)C_4H_9(n)$ | 8000 |
| P-65 | 90 | H | 8 | H | $C_{12}H_{25}(n)$ | 6000 |
| P-66 | 80 | $CH_3$ | 8 | $CH_3$ | $C_4H_9(sec)$ | 18000 |
| P-67 | 70 | $CH_3$ | 8 | $CH_3$ | $CH_3$ | 22000 |
| P-68 | 70 | H | 10 | $CH_3$ | H | 17000 |
| P-69 | 90 | H | 10 | H | H | 9000 |
| P-70 | 95 | H | 4 | $CH_3$ | $-(CH_2CH_2O)_2-H$ | 18000 |
| P-71 | 80 | H | 4 | H | $-(CH_2CH_2O)_2-CH_3$ | 16000 |
| P-72 | 80 | H | 4 | H | $-(C_3H_6O)_6-H$ | 24000 |
| P-73 | 70 | $CH_3$ | 4 | H | $-(C_3H_6O)_{13}-H$ | 18000 |
| P-74 | 90 | H | 6 | H | $-(CH_2CH_2O)_2-H$ | 14000 |
| P-75 | 90 | H | 6 | $CH_3$ | $-(CH_2CH_2O)_8-H$ | 9000 |
| P-76 | 80 | H | 6 | H | $-(CH_2CH_2O)_2-C_4H_9(n)$ | 12000 |
| P-77 | 80 | H | 6 | H | $-(C_3H_6O)_6-H$ | 15000 |
| P-78 | 75 | F | 6 | H | $-(C_3H_6O)_{13}-H$ | 11000 |
| P-79 | 85 | $CH_3$ | 6 | $CH_3$ | $-(C_3H_6O)_{20}-H$ | 18000 |
| P-80 | 95 | $CH_3$ | 6 | $CH_3$ | $-CH_2CH_2OH$ | 27000 |
| P-81 | 80 | H | 8 | $CH_3$ | $-(CH_2CH_2O)_8-H$ | 12000 |
| P-82 | 95 | H | 8 | H | $-(CH_2CH_2O)_9-CH_3$ | 20000 |
| P-83 | 90 | H | 8 | H | $-(C_3H_6O)_6-H$ | 8000 |
| P-84 | 95 | H | 8 | H | $-(C_3H_6O)_{20}-H$ | 15000 |
| P-85 | 90 | F | 8 | H | $-(C_3H_6O)_{13}-H$ | 12000 |
| P-86 | 80 | H | 8 | $CH_3$ | $-(CH_2CH_2O)_2-H$ | 20000 |
| P-87 | 95 | $CH_3$ | 8 | H | $-(CH_2CH_2O)_9-CH_3$ | 17000 |
| P-88 | 90 | $CH_3$ | 8 | H | $-(C_3H_6O)_6-H$ | 34000 |
| P-89 | 80 | H | 10 | H | $-(CH_2CH_2O)_3-H$ | 19000 |
| P-90 | 90 | H | 10 | H | $-(C_3H_6O)_6-H$ | 8000 |
| P-91 | 80 | H | 12 | H | $-(CH_2CH_2O)_7-CH_3$ | 7000 |
| P-92 | 95 | $CH_3$ | 12 | H | $-(C_3H_6O)_7-H$ | 10000 |

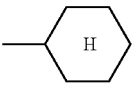

| | x | R¹ | p | q | R² | R³ | Mw |
|---|---|---|---|---|---|---|---|
| P-93 | 80 | H | 2 | 4 | H | $C_4H_9(n)$ | 18000 |
| P-94 | 90 | H | 2 | 4 | H | $-(CH_2CH_2O)_9-CH_3$ | 16000 |
| P-95 | 90 | $CH_3$ | 2 | 4 | F | $C_6H_{13}(n)$ | 24000 |
| P-96 | 80 | $CH_3$ | 1 | 6 | F | $C_4H_9(n)$ | 18000 |
| P-97 | 95 | H | 2 | 6 | H | $-(C_3H_6O)_7-H$ | 21000 |

-continued

| | | | | | | | |
|---|---|---|---|---|---|---|---|
| P-98 | 90 | CH$_3$ | 3 | 6 | H | —CH$_2$CH$_2$OH | 9000 |
| P-99 | 75 | H | 1 | 8 | F | CH$_3$ | 12000 |
| P-100 | 80 | H | 2 | 8 | H | CH$_2$CH(C$_2$H$_5$)C$_4$H$_9$(n) | 34000 |
| P-101 | 90 | CH$_3$ | 2 | 8 | H | (C$_3$H$_6$O)$_7$—H | 11000 |
| P-102 | 80 | H | 3 | 8 | CH$_3$ | CH$_3$ | 18000 |
| P-103 | 90 | H | 1 | 10 | F | C$_4$H$_9$(n) | 27000 |
| P-104 | 95 | H | 2 | 10 | H | —(CH$_2$CH$_2$O)$_9$—CH$_3$ | 12000 |
| P-105 | 85 | CH$_3$ | 2 | 10 | CH$_3$ | C$_4$H$_9$(n) | 20000 |
| P-106 | 80 | H | 1 | 12 | H | C$_6$H$_{13}$(n) | 8000 |
| P-107 | 90 | H | 1 | 12 | H | —(C$_3$H$_6$O)$_{13}$—H | 15000 |
| P-108 | 80 | CH$_3$ | 3 | 12 | CH$_3$ | C$_2$H$_5$ | 12000 |
| P-109 | 60 | H | 1 | 16 | H | CH$_2$CH(C$_2$H$_5$)C$_4$H$_9$(n) | 20000 |
| P-110 | 80 | CH$_3$ | 1 | 16 | H | —(CH$_2$CH$_2$O)$_2$—C$_4$H$_9$(n) | 17000 |
| P-111 | 90 | H | 1 | 18 | H | —CH$_2$CH$_2$OH | 34000 |
| P-112 | 60 | H | 3 | 18 | CH$_3$ | CH$_3$ | 19000 |

P-113 Mw 39000

P-114 Mw 45000

P-115 Mw 46000

P-116 Mw 28000

P-117 Mw 56000

P-118 Mw 32000

P-119 Mw 29000

P-120 Mw 45000

P-121 Mw 30000

P-122 Mw 32000

-continued

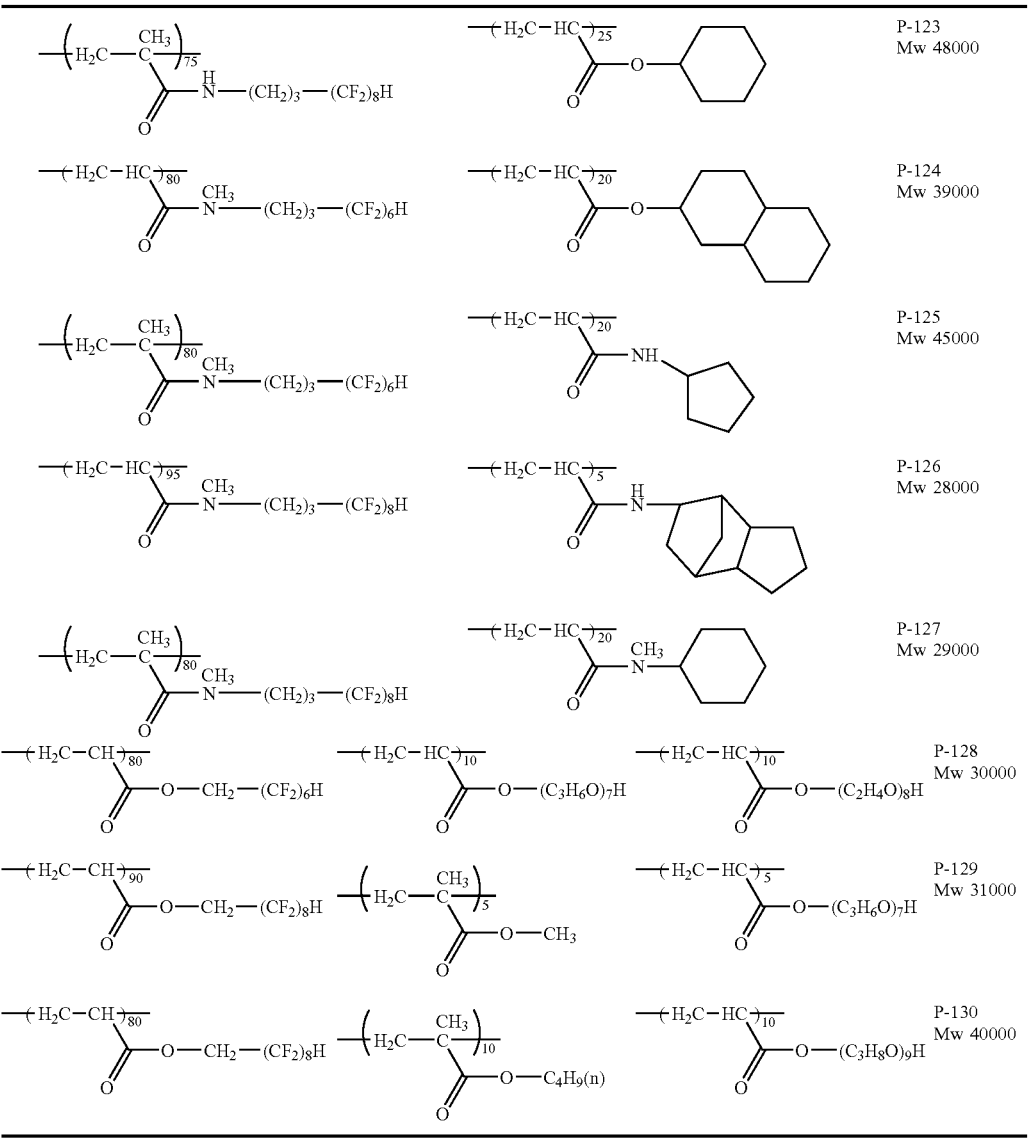

In the invention, the fluorine-containing polymers may be used solely or with two or more polymers. The foregoing fluorine-containing polymers may be added preferably in a range between 0.01% and 10% by mass with respect to the addition amount of the discotic liquid crystal compound, more preferably in a range between 0.05% and 5% by mass and more further preferably in a range between 0.1% and 3% by mass.

[First Optically Anisotropic Layer]

The first optically anisotropic layer used in the invention is 40 to 200 nm in Re with respect to the visible light, and preferably 50 to 120 nm. The first optically anisotropic layer may be formed, for example, by compositions containing rod-like liquid crystal compounds. The foregoing rod-like liquid crystal compound preferably contains a polymerization group. It is preferable that the rod-like liquid crystal compound having a polymerization group is substantially fixed to be horizontally (homogenous) oriented. "Substantially horizontal" means that the mean angle (mean tilt angle) formed between the longitudinal axis of rod-like liquid crystal compound molecules and the plane of the optically anisotropic layer is in a range between 0° to 10°. The rod-like liquid crystal compound molecules may be subjected to a slant orientation. It is also preferable in the case of the slant orientation that the mean tilt angle is in a range between 0° to 20°.

Preferable rod-like liquid crystal compounds include azomethines, azoxys, cyanobiphenyls, cyanophenylesters, benzoic acid esters, cyclohexane carboxylic acid phenylesters, cyanophenylcyclohexanes, cyanosubstituted phenylpyrimidines, alkoxy-substituted phenylpyrimidines, phenyldioxanes, tolans and alkenylcyclohexyl benzonitriles. In addition to these low-molecular liquid crystal molecules, macromolecule liquid crystal molecules may be used similarly. Particularly preferably used rod-like liquid crystal compounds having a low-molecular polymerization group are rod-like liquid crystal compounds represented by the following formula (IV).

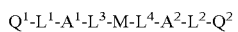   Formula (IV)

In the above formula, $Q^1$ and $Q^2$ denote individually and independently a polymerization group, $L^1$, $L^2$, $L^3$ and $L^4$ denote individually and independently a single bond or a bivalent coupler, $A^1$ and $A^2$ denote a spacer group having a carbon atom number of 2 to 20, and M denotes a mesogen group.

Polymerized rod-like liquid crystal compounds will be further explained hereinafter. In the formula, $Q^1$ and $Q^2$ denote individually and independently a polymerization group. It is preferable that the polymerization group is polymerization-reacted through additive polymerization (including ring-opening polymerization) or condensation polymerization. In other words, the polymerization group is preferably a functional group which can be an additive polymerization reacted or condensation polymerization reacted. The following are examples of polymerization groups.

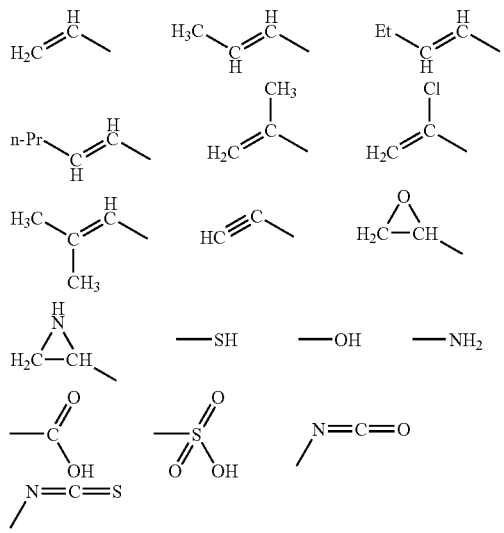

Bivalent couplers represented by $L^1$, $L^2$, $L^3$ and $L^4$ are preferably selected from —O—, —S—, —CO—, —NR²—, —CO—O—, —O—CO—O—, —CO—NR²—, —NR²—CO—, —O—CO—, —O—CO—NR²—, —NR²—CO—O—, —NR²—CO—NR²—or a group consisiting of mono-bonds. The above $R^2$ is an alkyl group having a carbon atom number of 1 to 7 or a hydrogen atom. It is preferable that $L^3$ and $L^4$ are respectively —O— and O—CO—O—. Of the groups shown by a combination of $Q^1$ with $L^1$ or $Q^2$ with $L^2$, $CH_2$=CH—CO—O—, $CH_2$=C($CH_3$)—CO—O— and $CH_2$=C(Cl)—CO—O— are preferable, and $CH_2$=CH—CO—O— is most preferable.

$A^1$ and $A^2$ denote a spacer group having a carbon atom number of 2 to 20, preferably denotes an aliphatic group having a carbon atom number of 2 to 12. The spacer group is preferably in a chain structure and may include an oxygen atom or a sulfur atom which is not adjacent to each other. In addition, a halogen atom (a fluorine, chlorine, and bromine), a cyano group, methyl group or ethyl group may be substituted as a substituent.

Mesogen groups represented by M include any known mesogen groups, of which the groups represented by the following formula (V)) are preferable.

$$—(—W^1—L^5)_n—W^2— \qquad \text{Formula (V)}$$

Wherein $W^1$ and $W^2$ denote respectively a bivalent circular aliphatic group, a bivalent aromatic group and bivalent heterocycle group. Preferable $W^1$ and $W^2$ include a 1,4-cyclohexanediyl, a 1,4-phenylene, a naphthalene-2, a 6-diyl, naphthalene-1, a 5-diyl. A 1,4-cyclohexanediyl is available in structural isomers of trans form and cis form. In the invention, either of them may be used and a mixture at a given ratio may also be used, with the trans form being preferable. $L^5$ denotes any group represented by $L^1$ through $L^4$ or $CH_2$—O— or —O—$CH_2$—. $L^5$ is preferably —$CH_2$—O—, —O—$CH_2$—, —CO—O—, —CO—NR²—, —NR²—CO— or —O—CO—. n denotes 1, 2 or 3, of which 2 is preferable. $W^1$ and $W^2$ may have the respective substituents, and these substituents include a halogen atom (a fluorine, a chlorine, a bromine, and an iodine), a cyano group, an alkyl group having a carbon atom number of 1 to 10 (a methyl group, an ethyl group, and a propyl group, etc.), an alkoxy group having a carbon atom number of 1 to 10 (a methoxy group, and an ethoxy group, etc.), an acyl group having a carbon atom number of 1 to 10 (a formyl group, and an acetyl group, etc.), alkoxycarbonyl group having a carbon atom number of 2 to 10 (a methoxycarbonyl group, and an ethoxycarbonyl group, etc.), an acyloxy group having a carbon atom number of 2 to 10 (an acetyl oxy group, and a propionyloxy group, etc.), a nitro group, a trifluoromethyl group and a difluoromethyl group. The following are preferable basic structures of mesogen groups represented by the formula (V). These groups may be substituted with the above substituents.

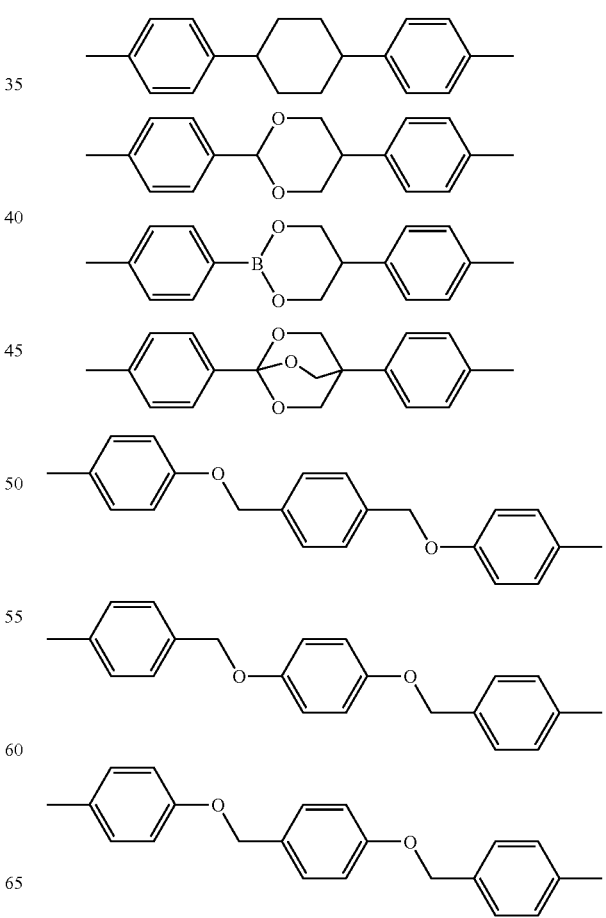

-continued
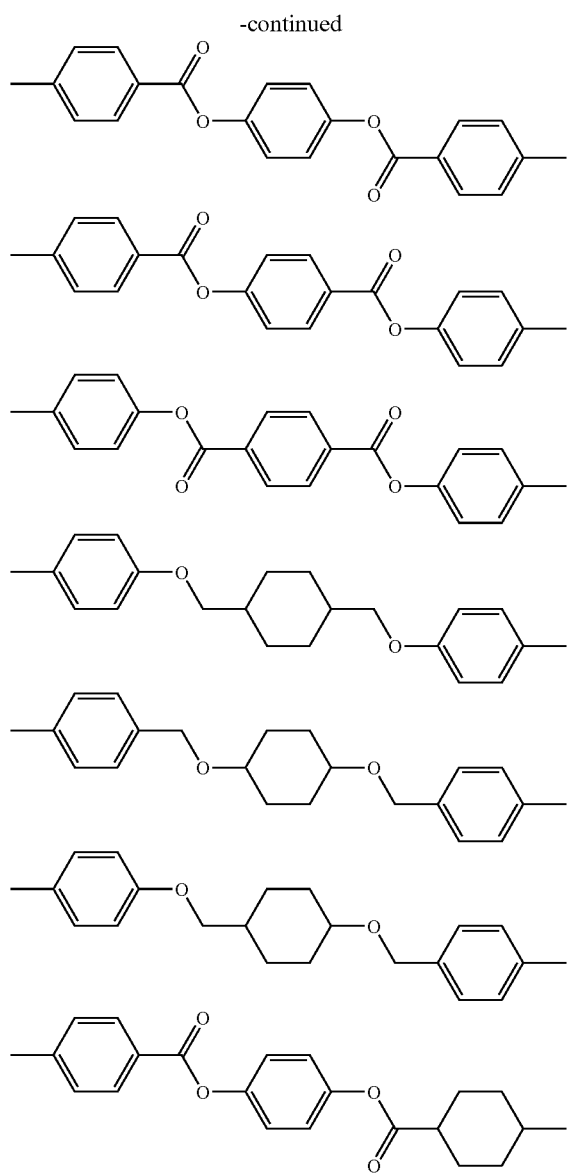
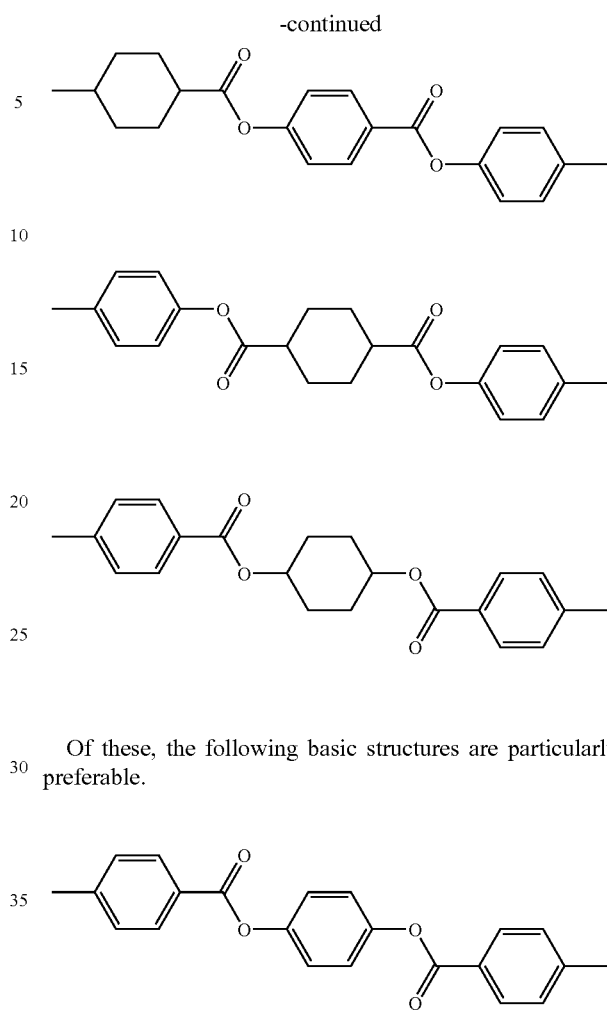
Of these, the following basic structures are particularly preferable.
The following are examples of compounds represented by the formula (IV) usable in the invention, however, the invention is not limited thereto. Compounds represented by the formula (IV) may be synthesized with reference to the method described in JP-A-11-513019.
IV-1
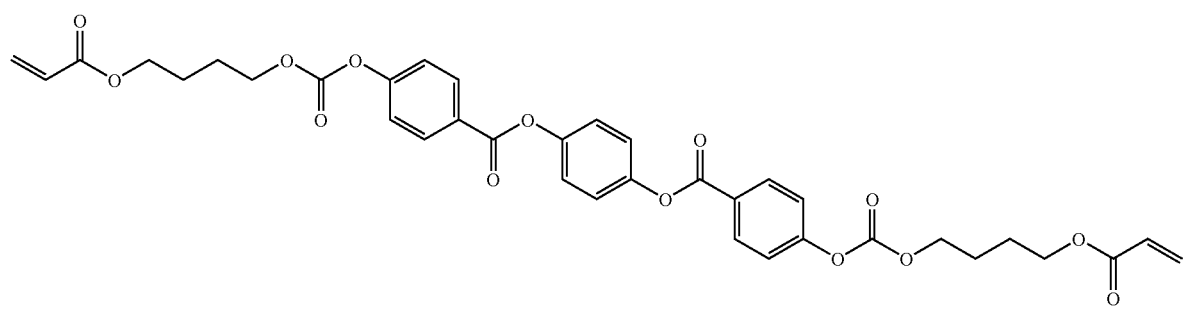

-continued
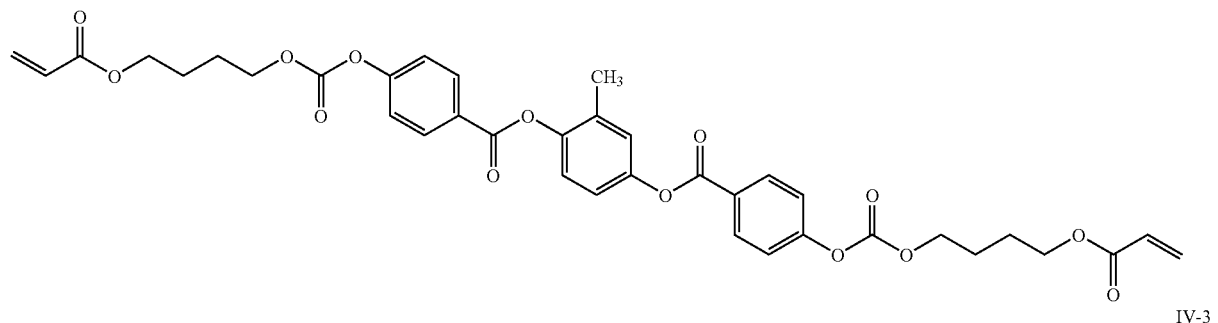
IV-2
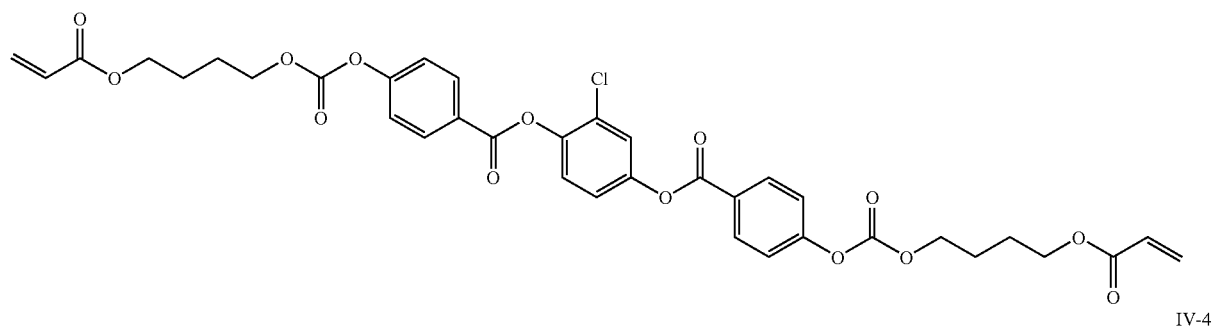
IV-3
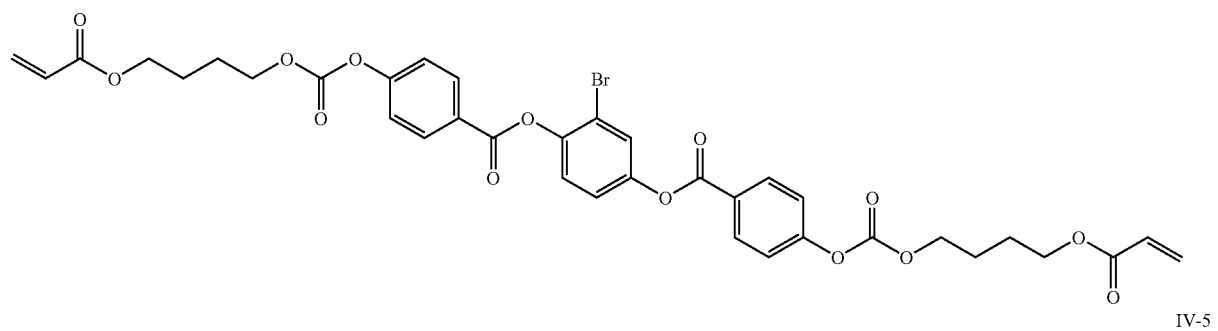
IV-4
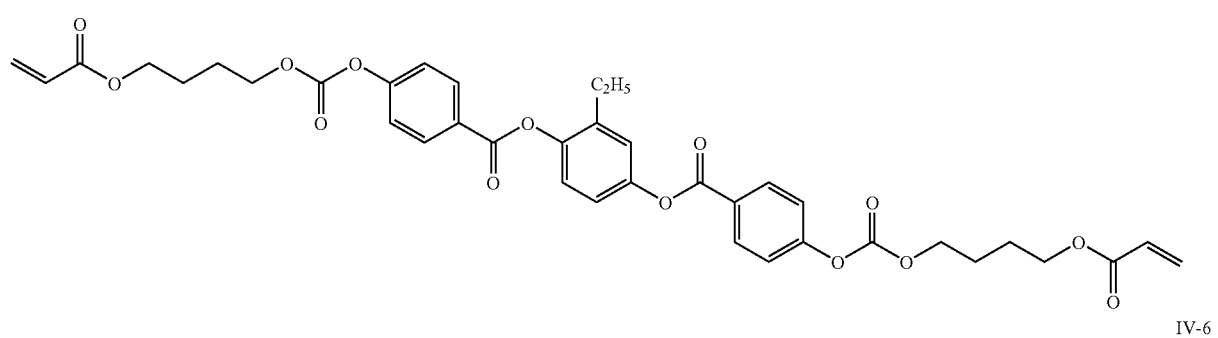
IV-5
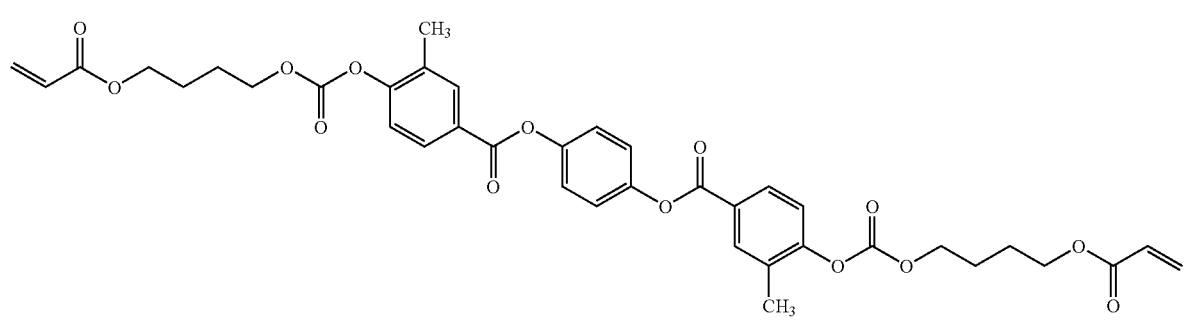
IV-6

-continued
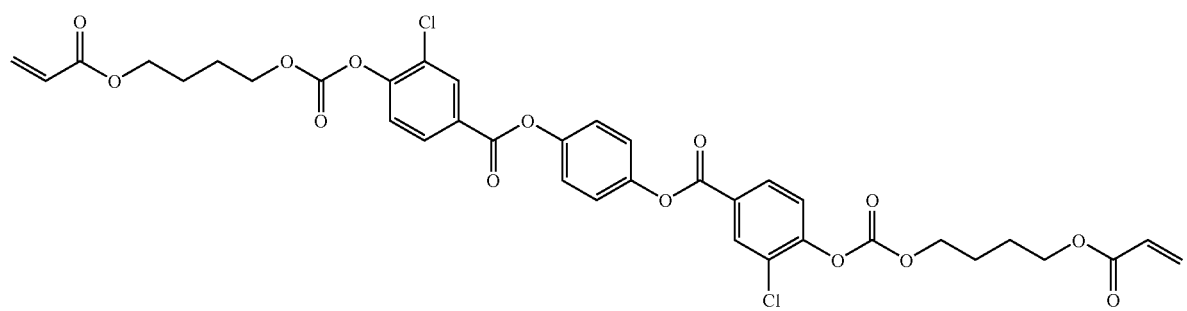
IV-7
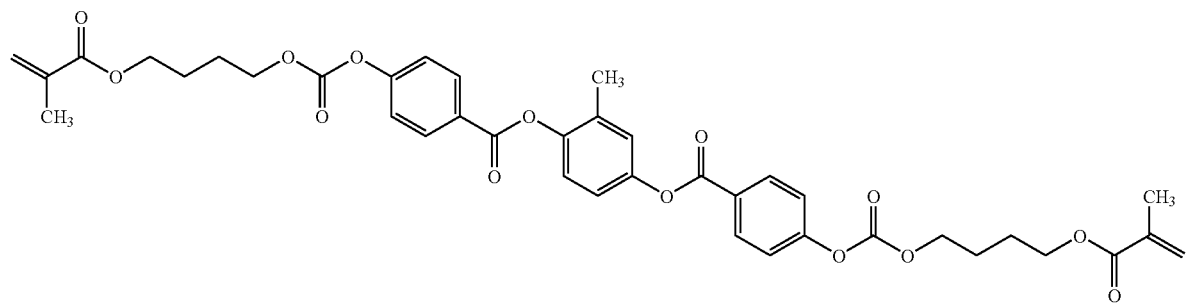
IV-8
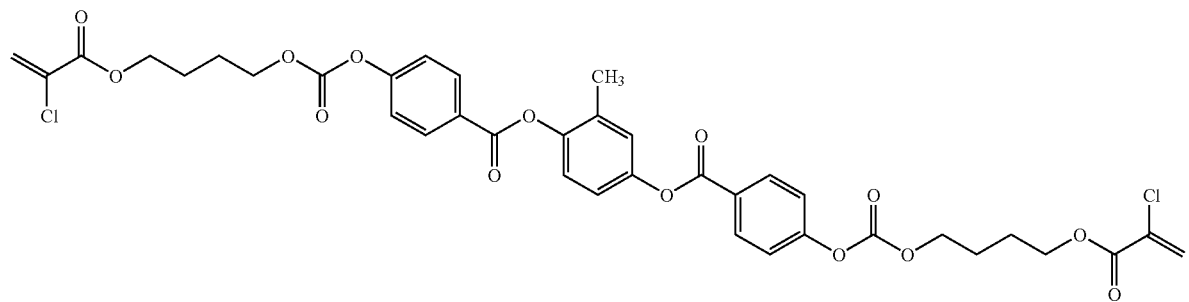
IV-9
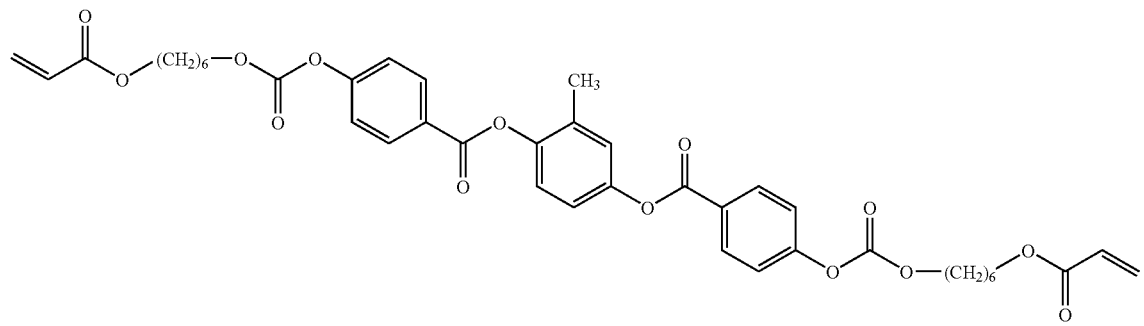
IV-10

IV-11
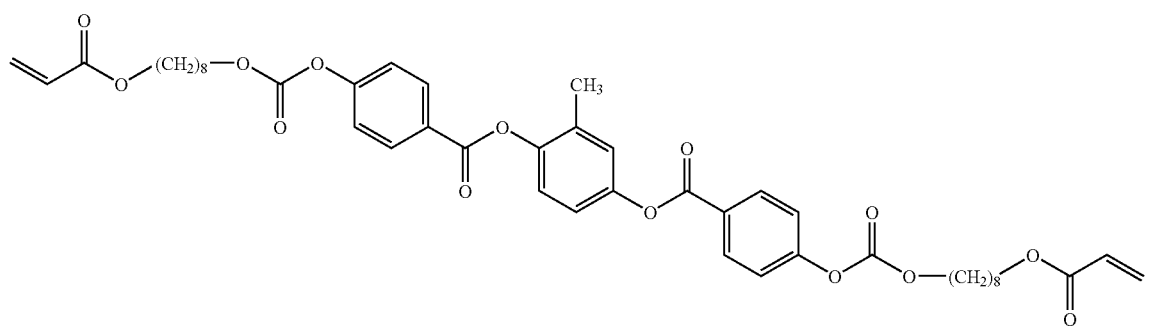
IV-12
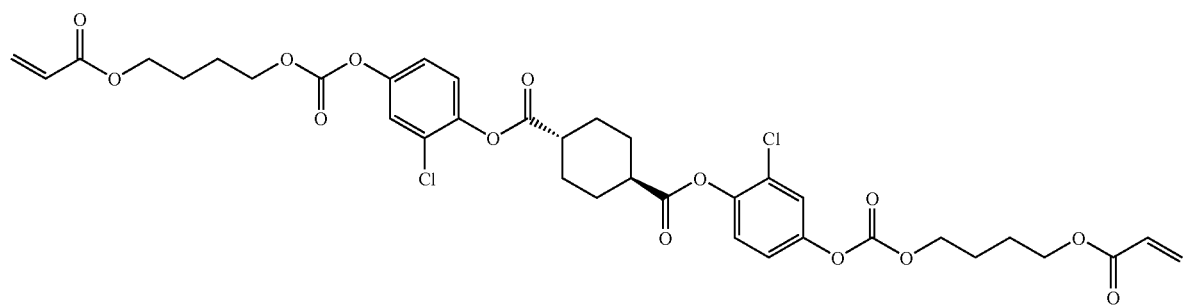
IV-13
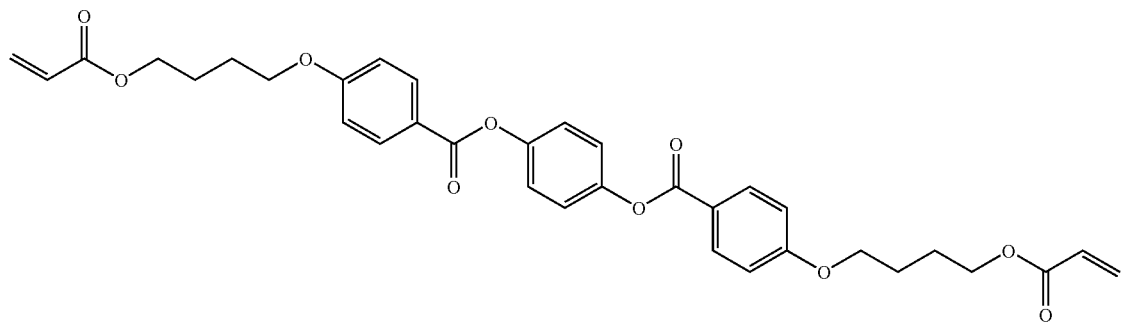
IV-14
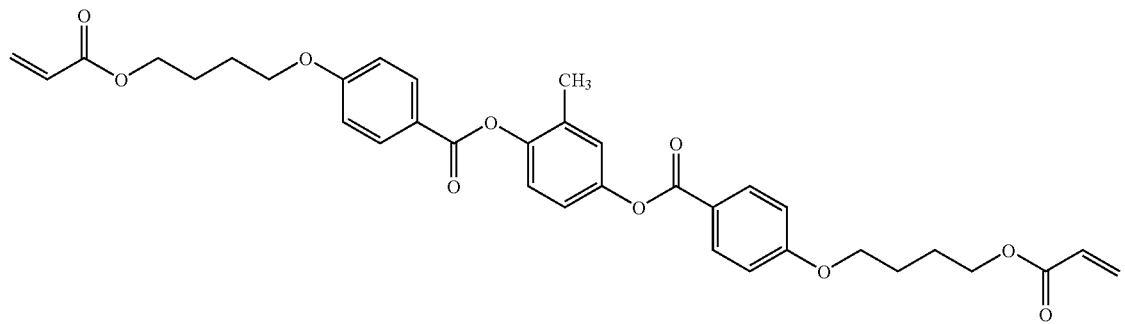

-continued
IV-15
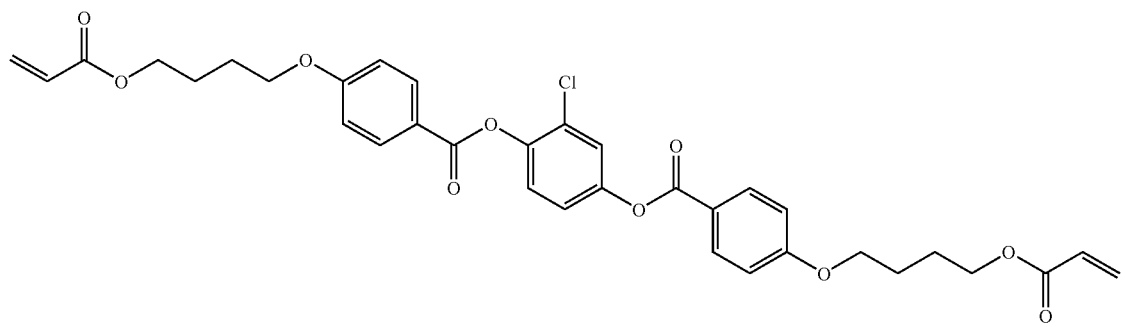
IV-16
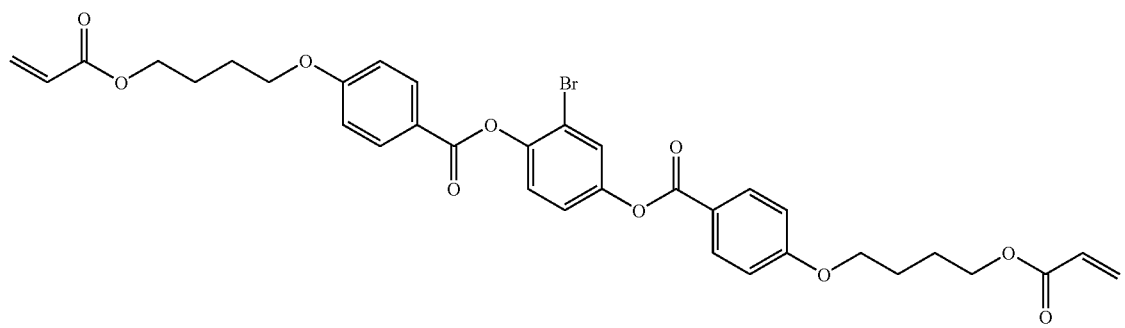
IV-17
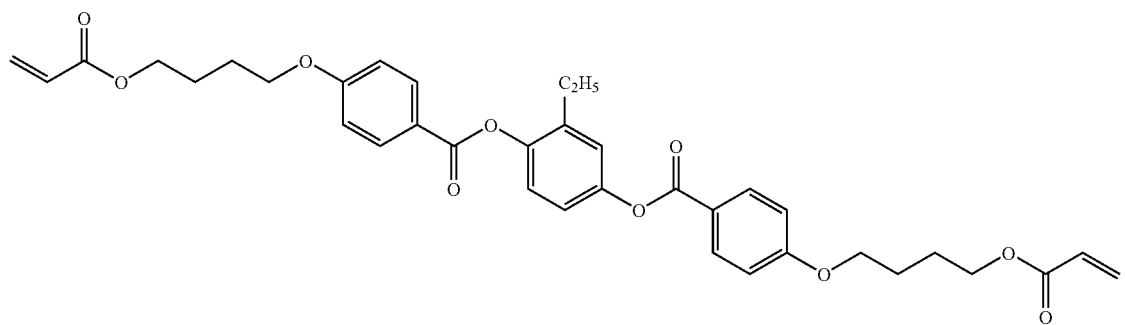
IV-18
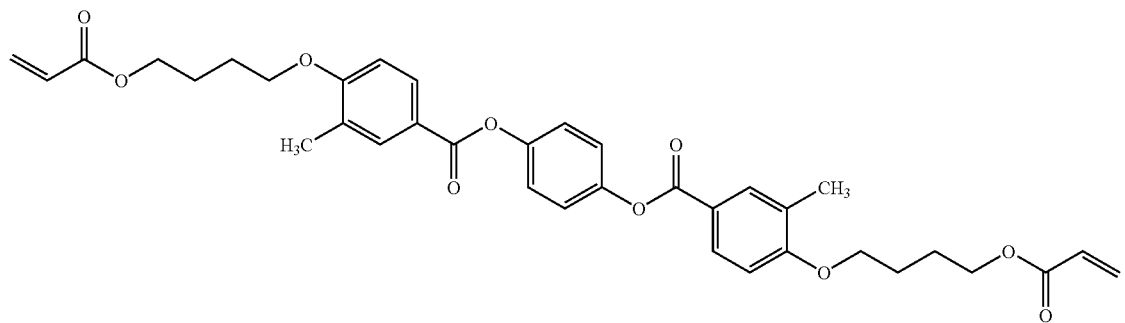

-continued
IV-19
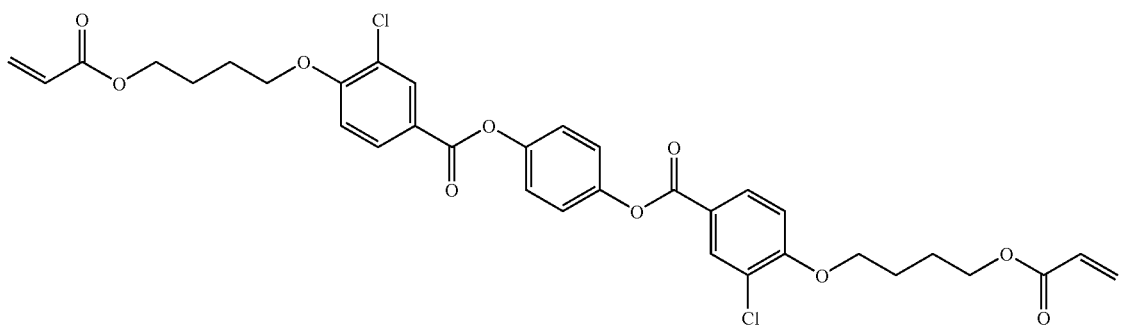
IV-20
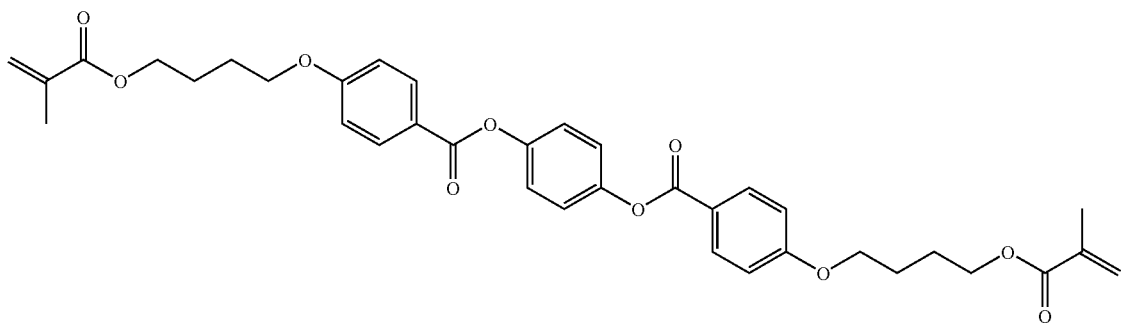
IV-21
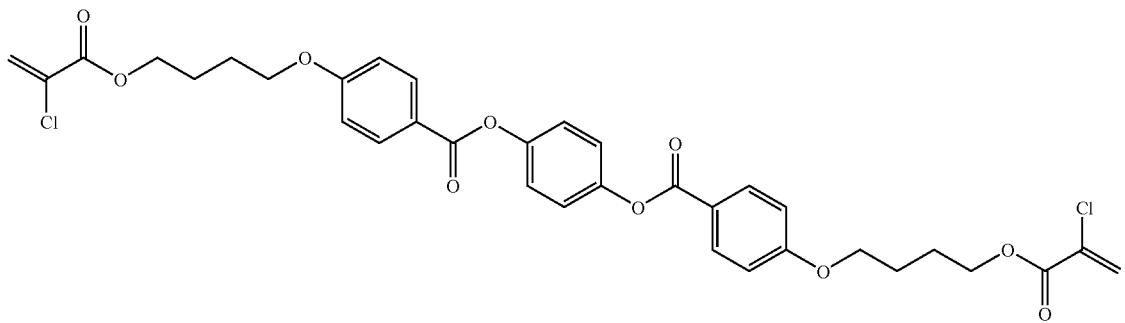
IV-22
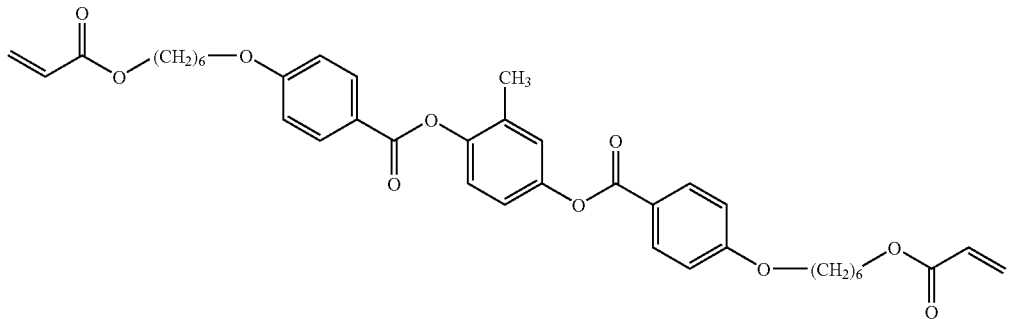

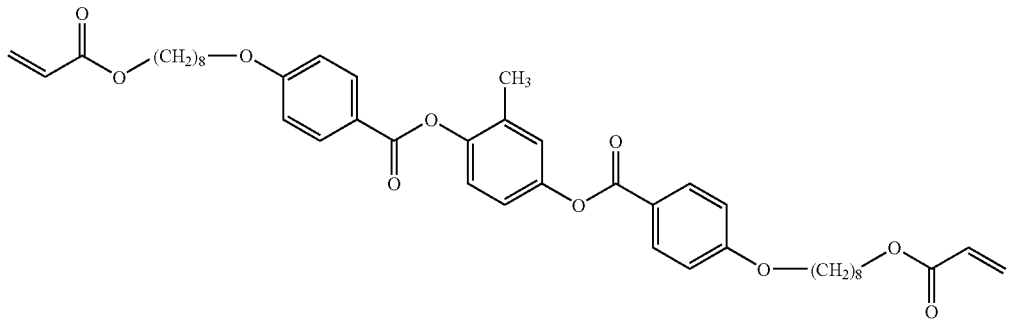

IV-23

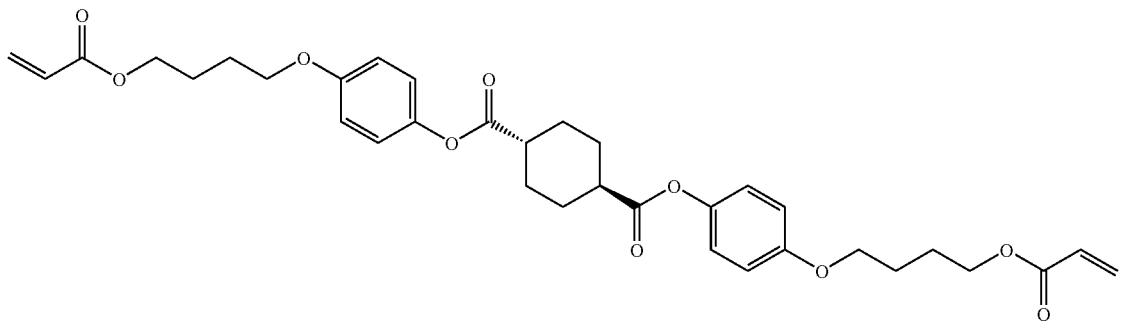

IV-24

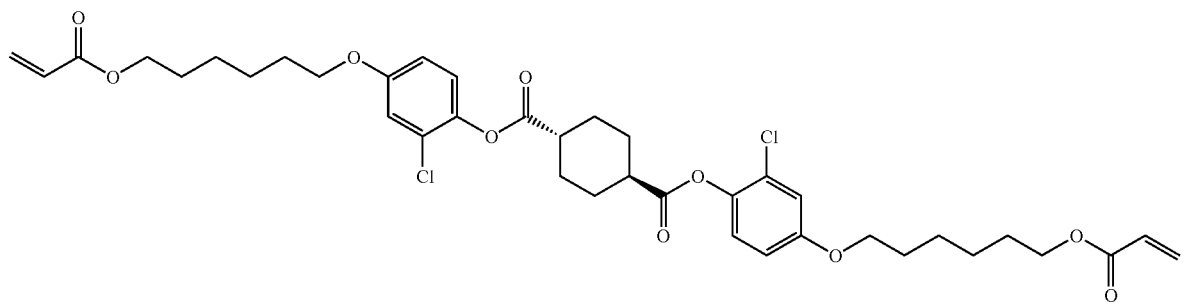

IV-25

Where the first optically anisotropic layer is formed with macromolecule polymers, there is no restriction on the thickness, as long as Re is 40 to 200 nm. Re is preferably 40 to 100 nm.

To be more specific, the macromolecule polymers usable in the invention include conventionally known polymers for example, norbornene macromolecules, polycarbonate macromolecules, polyalylate macromolecules, polyester macromolecules, aromatic macromolecules such as polysulfone and triacetyl cellulose, which form a film by solvent casting or extrusion molding are given.

Films made of thermoplastic resins produced by an appropriate method such as extrusion molding and casting film can be formed by being subjected to stretching such as vertical stretching with rolls, traverse stretching with tenters or biaxial stretching. The stretching is preferably done at temperatures around the glass transition temperature (Tg) of the film to be processed or at temperatures between Tg and the melting point during the process. The film can be produced by the vertical stretching process using a roll, a method for heating atmosphere, a combined method of these methods or any other appropriate heating method. The film can also be produced by appropriate biaxial stretching methods using a tenter, for example, simultaneous biaxial stretching method using a whole tenter or gradual biaxial stretching method using a roll tenter.

It is preferable that the film is uniform in orientation and small in phase difference. The film can be formed in any thickness appropriately depending on the phase difference and others, in general, 1 to 300 μm, in process from 10 to 200 μm and particularly preferably 20 to 150 μm during the process.

Herein, norbornene macromolecules include polymers which primarily consist of a norbornene monomer such as a norbornene and its derivatives, a tetracyclodocecen and its derivatives, a dicyclopentadiene and its derivatives, a metatetrahydroxy fluorene and its derivatives, including a ring-opening polymer of norbornene monomers, a ring-opening polymer of norbornene monomers with other monomers which can be ring-opening copolymerized, additive polymer of norbornene monomers, additive polymer of norbornene monomers with other monomers which can be copolymerized and their hydrogen additives. Of these polymers, the ring-opening polymer of norbornene monomers and the hydrogen additive are most preferable in terms of heat resistance, mechanical strength and others. Norbornene polymers, monocyclic circular olefin polymers or circular conjugated diene polymers may be adjusted for the molecular weight appropriately depending on usage. Cyclohexane solution (toluene solution, if the polymer resin is not dissolved) was subjected to gel permeation chromatography to obtain the weight-average molecular weight converted by polyisoprene or polystyrene. Where the thus obtained molecular weight is usually from 5,000 to 500,000, preferably 8,000 to 200,000 and more preferably 10,000 to 100,000, the film (A) is well balanced in terms of mechanical strength and moldability and preferably used in the invention.

Polycarbonate macromolecules usable for the above optically anisotropic layer include polycarbonate and mixtures with other polymers.

Polyalylate macromolecules usable for the above optically anisotropic layer include a polyoxybenzoate, etc., and mixtures with other polymers.

Polyester macromolecules usable for the above optically anisotropic layer include a polyethylene terephthalate, a polyethylene isophthalate, a polyphenylene isophthalate, a polybutylene terephthalate, pa olyethylene-2, a 6-naphthalate, etc., and mixtures with other polymers.

Aromatic macromolecules such as polysulfone usable for the above optically anisotropic layer include a polysulfone, a polyethersulfone, a polyallyl sulfone, etc., and a mixture with other polymers.

Glass transition temperatures (Tg) of the transparent resin used in the invention may be appropriately selected depending on the intended use, and preferably above 70° C., more preferably in a range between 80 and 250° C. and particularly preferably in a range between 90 and 200° C. Heat resistance and moldability are well balanced in these temperature ranges, and are, therefore, preferable.

Transparent resins may be molded into a sheet or a film by, for example, heating melt molding or solvent casting. The heating melt molding is further classified into extrusion molding, press molding, inflation molding, injection molding, blow molding and stretching molding. Of these methods, in order to obtain a film excellent in mechanical strength, surface precision and others, extrusion molding, inflation molding and press molding are preferable, and extrusion molding is most preferable. Molding conditions may be selected appropriately depending on the intended use and the molding method. In the case of heating and melt process, the cylinder temperature is set preferably to 100 to 400° C. and more preferably to 150 to 350° C. The above sheet or film is set preferably to 10 to 300 μm in thickness and more preferably to 30 to 200 μm.

When the glass transition temperature of said transparent resin is Tg, the above sheet or film is stretched preferably in a range from Tg−30° C. to Tg+60° C., more preferably Tg−10° C. to Tg+50° C., at least in one direction and preferably at a stretch ratio from 1.01 to 2. The stretched direction should be at least in one direction. Where the sheet is obtained by extrusion molding, the direction is preferably toward the mechanical flow of resin (in the direction of extrusion) and the sheet is preferably stretched by free contraction monoaxial stretching, width-fixed monoaxial stretching or biaxial stretching.

The stretching method is specifically described as follows:
(1) A sheet is passed through a roll heated at a constant temperature (heated roll) to adjust to a desired temperature.
(2) The temperature-adjusted sheet is subsequently passed through the first roll rotating at a relatively slow speed and then through the second roll rotating at a faster speed to stretch. The rotating speed ratio of the first and second roll rotating speeds is controlled so that the stretch ratio can be adjusted in a range from 1 to 4. It is also preferable to install an infrared heater between the heated roll, the first roll and the second roll, so as to keep the sheet at a constant temperature.
(3) The stretching film is cooled through a cooling roll.
(4) The cooled stretched film is collected by using a winding roll. In order to prevent blocking between the films due to winding, it is acceptable to provide a masking film similar in width with the stretched film so that the masking film and the stretched film can be wound up together or to provide a narrow-width tape with a weak adhesive force at least on one end or on both ends of the stretched film so as to be wound up together.

It is acceptable that the sheet passed through the heated roll in the above step (1) is higher in temperature than the heated roll or in a state immediately after being molded by an extruder. However, since the sheet can be molded at a high stretch ratio, preferably it is lower in temperature than the heated roll and more preferably at a room temperature. The said sheet is once cooled after sheet molding and collected in a roll by using a winder. Further, the sheet should be stretched preferably at a speed 5 to 1000 mm/second and more preferably at 10 to 750 mm/second. At the above speed range, stretching can be done easily to reduce in-plane fluctuation (variation) in-plane precision and retardation.

[Fixed Orientation State of Liquid Crystal Compound]

Where the optically anisotropic layer is made of a liquid crystal compound, it is desirable to fix the liquid crystal compound, with the orientation state kept as it is. It is preferable to fix by utilizing a polymerization reaction of the polymerization group introduced into the liquid crystal compound. The polymerization reaction includes thermal polymerization reaction using a thermal polymerization initiator and photo polymerization reaction using a photopolymerization initiator, however, the photo polymerization reaction is more preferable. The photo polymerization initiators include α-carbonyl compounds (described in U.S. Pat. No. 2,367,661 and No. 2,367,670), acyloin ether (U.S. Pat. No. 2,448,828), α-hydrocarbon substituted aromatic acyloin compounds (U.S. Pat. No. 2,722,512), multi-nuclear quinone compounds (U.S. Pat. No. 3,046,127, and No. 2,951,758), combination of tirarylimidazole dimer with p-aminophenyl ketone (U.S. Pat. No. 3,549,367), acridine and phenazine compounds (JP-A-60-105667 and U.S. Pat. No. 4,239,850) and oxadiazole compounds (U.S. Pat. No. 4,212,970).

The photo polymerization initiator is used preferably at 0.01 to 20% by mass with respect to the solid content of a coating solution, and more preferably at 0.5 to 5% by mass. Exposure to light for polymerizing the liquid crystal compound is preferably done by using ultraviolet rays. Exposure energy is preferably 20 mJ/cm$^2$ to 50 J/cm$^2$, and more preferably 100 to 800 mJ/cm$^2$. It is acceptable to conduct exposure to light under heating conditions for promoting the photo polymerization reaction. The optically anisotropic layer is preferably 0.1 to 10 μm in thickness and more preferably 0.5 to 5 μm.

It is preferable that the optically anisotropic layer is formed by coating on an oriented film a coating solution containing a liquid crystal compound, the above-described polymerization initiator and other additive agents. Organic solvents are preferably used for preparing the coating solution. The organic solvents include an amide (e.g., a N,N-dimethylform amide), a sulfoxide (e.g., a dimethyl sulfoxide), a heterocycle compound (e.g., a pyridine), a hydrocarbon (e.g., a benzene and a hexane), an alkylhalide (e.g., a chloroform and a dichloromethane), an ester (e.g., a methyl acetate and a butyl acetate), a ketone (e.g., an acetone and a methylethyl ketone), and an ether (e.g., a tetrahydrofuran and 1,2-a dimethoxyethane) Alkylhalide and ketone are preferable. It is also acceptable to use two or more organic solvents, together. The coating solution can be coated by a known method (e.g., extrusion coating, direct gravure coating, reverse gravure coating, or die coating).

[Oriented Film]

It is preferable to use an oriented film for orienting a liquid crystal compound. Oriented films are also known that provides an orientation function by application of electric field or magnetic field or exposure to light.

Types of polymers usable for the oriented film may be selected depending on orientation of liquid crystal compounds (in particular mean tilt angle). For example, polymers (polymers for normal orientation) which do not reduce the surface energy of the oriented film are used for orienting horizontally the liquid crystal compound. Specific types of polymers are described for liquid crystal cells or optically compensated sheets in a variety of scientific articles. Particularly where the liquid crystal compound is oriented in such direction orthogonal to the rubbing direction, modified polyvinyl alcohols described in JP-A-2002-62427, acrylic acid copolymers described in JP-A-2002-98836 and polyimides and polyamic acids described in 2002-268068 may be preferably used. It is preferable that any oriented film has a polymerization group for the purpose of improving a close contact of the liquid crystal compound with the transparent optical film. The polymerization group can be introduced as a repeating unit having polymerization groups on side chains or a substituent of circular groups. It is more preferable to use an oriented film chemically bonding with the liquid crystal compounds on the interface, and such oriented film is described in JP-A-9-152509.

The oriented film is preferably 0.01 to 5 µm in thickness and more preferably 0.05 to 2 µm.

It is also acceptable that the oriented film is used to orient the liquid crystal compound, thereby fixing the liquid crystal compound to form an optically anisotropic layer, with the orientation kept as it is, and transferring only the optically anisotropic layer on to a polymer film (or a transparent optical film).

[Polarizing Film]

Next, a detailed explanation will be given for a polarizing film used in the liquid crystal display device of the invention. Any conventional common films may be used for this purpose without particular restrictions. For example, films made of hydrophilic polymers such as polyvinyl alcohol, partially formalized polyvinyl alcohol and a partially saponified product of ethylene/vinyl acetate copolymer to which dichromatic substances consisting of dichromatic dyes such as iodine and/or azoic dye, anthraquinone dye and tetrazine dye are adsorbed and are subjected to stretching and the orientation process can be used. In the invention, the stretching method described in JP-A-2002-131548 is preferably used, and a width-direction monoaxial stretch-type tenter which allows the absorption axis of a polarizing film to be substantially orthogonal to the longitudinal direction is particularly preferably used.

The polarizing film is usually used as a polarizing plate, at least one plane of which is protected by a protective film. No particular restriction is placed on types of protective films, and cellulose esters such as a cellulose acetate, a cellulose acetate butylate and a cellulose propionate, or a polycarbonate, a polyolefin, a polystyrene, a polyester, etc., may be used.

A protective film is usually supplied in a roll form and preferably bonded together continuously so as to correspond to a long polarizing film in the longitudinal direction. Herein, the orientation axis (slow axis) of the protective film may face in any direction, however, in terms of easier handling, it should be preferably parallel to the longitudinal direction. No particular restriction is placed on the angle formed between the slow axis (orientation axis) of the protective film and the absorption axis (stretch axis) of the polarizing film, and the angle may be appropriately set depending on the purpose of the polarizing plate.

Where the width-direction monoaxial stretch-type tenter preferably used in the invention is used to prepare a polarizing film, the slow axis (orientation axis) of the protective film is substantially orthogonal to the absorption axis (stretch axis) of the polarizing film.

It is preferable that the retardation (Re) of the protective film is less than 15 nm, for example, at 632.8 nm and more preferably less than 5 nm. Polymers used as a protective film are preferably polyolefins such as cellulose triacetate or Zeonex and Zeonor (both made by Zeon Corporation) and ARTON (made by JSR), with such low retardation taken into account. Other preferable polymers include, for example, non-birefringent optical resin materials described in JP-A-8-110402 and JP-A-11-293116.

In the invention, the substrate of the liquid crystal cell, the protective film of the polarizing film or the polarizing film may also be used as an optical film for making the device thinner. Where the polarizing film is also used as an optical film, no protective film is needed on the polarizing plate.

It is preferable that the optically anisotropic layer and the polarizing film are fixed for preventing deviation of the beam axis or dust or foreign matter from entering into the device. The layer or the film may be fixed by any appropriate method, for example, a method for attaching it through a transparent adhesive layer. No particular restriction is placed on types of the adhesive agent. Preferable agents which do not require a high-temperature process for curing or drying in attachment or do not take a long time for curing or drying, in terms of preventing possible change in optical properties of components are desired. For meeting such requirements, hydrophilic polymer-based adhesive agents or pressure-sensitive adhesive layers are preferably used.

The foregoing pressure-sensitive adhesive layer may be formed by using transparent adhesive agents made of appropriate polymers such as acrylic polymer, silicone polymer, polyester, polyurethane, polyether and synthetic rubbers. Of these agents, acrylic adhesive agents are preferable in terms of optical transparency, adhesive characteristics and weather resistance. The pressure-sensitive adhesive layer may be provided on either or both planes of the polarizing plate, when necessary, for attachment to an object to be attached such as liquid crystal cells. In this case, where the pressure-sensitive adhesive layer is exposed to the surface, it is preferable to temporarily fix a separator or others to prevent the pressure-sensitive adhesive layer surface from contaminating until actually used.

It is also acceptable to provide a polarizing plate having appropriate functional layers such as a protective film for water resistance or others similar to the above protective film, an anti-reflection layer for preventing surface reflection and/or a glare-proof layer on either or both planes of the polarizing film. The foregoing anti-reflection layer may be appropriately formed as a coated layer made of fluorinated polymer or a coherent layer made of multi-layered metallized films, for example. The glare-proof layer may also be formed by, for example, applying a resin-coating layer containing fine particles or providing a fine unevenness structure by appropriate methods such as a sandblast and etching process so as to diffuse reflection on the surface.

Inorganic fine particles which may be electrically conductive such as silica with a mean particle size of 0.5 to 20 µm, calcium oxide, alumina, titania, zirconia, tin oxide, inidium oxide, cadmium oxide and antimony oxide or cross-linked or non-cross-linked organic fine particles made of appropriate polymers such as polymethyl methacrylate and polyurethane are, for example, one type or two or more types to be used. The above adhesive layer and the pressure-sensitive adhesive layer may contain these fine particles to exhibit light diffusion properties.

[Optical Performance of Polarizing Plate]

It is preferable that the polarizing plate consisting of a protective film, a polarizing film and a transparent optical film according to the invention preferably has performance equal to or better than commercially available super-high contrast products (for example, HLC2-5618, etc., made by Sanritz Corporation) in optical characteristics and durability (short-term and long-term storage stability). To be specific, the polarizing plate is 42.5% or higher in visible light transmission efficiency, $(\{(Tp-Tc)/(Tp+Tc)\}^{1/2} \geqq 0.9995$ in polarization degree (wherein Tp is parallel transmission efficiency and Tc, orthogonal transmission efficiency), preferably 3% or lower and more preferably 1% or lower in the rate change in approximate light transmission efficiency based on the absolute value when allowed to stand at 60° C. and 90RH % at 80° C. for 500 hours and in a dry atmosphere for 500 hours, and preferably 1% or lower and more preferably 0.1% or lower in the rate of change in the polarization degree based on the absolute value.

The present invention will be further specifically explained with reference to the following examples of the present invention. The materials, amounts, ratios, types and procedures of treatments and so forth shown in the following examples can be suitably changed unless such changes depart from the gist of the present invention. Accordingly, the scope of the present invention should not be construed as limited to the following specific examples.

EXAMPLE 1

<Preparation of Vertically Oriented Liquid Crystal Cell>

To 3% by weight of polyvinyl alcohol was added 1% by weight of octadecyldimethyl ammonium chloride (coupling agent). The resulting solution was spin-coated on an ITO electrode-equipped glass substrate and heat-treated at 160° C., and then subjected to rubbing treatment to form a vertically oriented film. The rubbing treatment was carried out on two sheets of glass substrates to give a counter direction. These 2 glass substrates were faced to each other so that a cell gap (d) was approximately 4.3 µm. A liquid crystal compound (Δn:0.06) primarily made of esters and ethanes was filled into the cell gap to prepare a vertically oriented liquid crystal cell. Product of Δn with d was 260 nm.

<Preparation of Film Sample 1>

A cellulose acetate solution was prepared by feeding the following compositions into a mixing tank and agitating them by heating so as to dissolve the individual compositions.

| (Dope composition 1) | |
|---|---|
| Cellulose triacetate synthesized from cotton linter (substitution degree of acetyl group: 61.0%) | 50 mass parts |
| Cellulose triacetate synthesized from wood pulp (substitution degree of acetyl group:: 61.0%) | 50 mass parts |
| Tinuvin 326 (ultraviolet absorber 1 made by Ciba Specialty Chemicals) | 0.5 mass parts |
| Tinuvin 328 (ultraviolet absorber 2 made by Ciba Specialty Chemicals) | 0.5 mass parts |
| Triphenyl phosphate (plasticizer A) | 12 mass parts |
| Methylene chloride | 460 mass parts |
| Ethanol | 40 mass parts |

The above composition was fed into a sealed container, kept at 80° C. under pressure and agitated so as to obtain a complete dissolution. Next, the dope was filtered, cooled and kept at 31° C. and cast uniformly on a 6-meter long endless stainless steel band rotating which was placed between two drums. Subsequently, at the time when a solvent was allowed to evaporate until the remaining solvent is 50%, the cast film was peeled from the stainless steel band at a tensile force of 17 kg/m, transferred at a tensile force of 13 kg/m and dried to obtain a cellulose triacetate (TAC).

(Saponification of Cellulose Acetate Film)

The above TAC was passed through a dielectric-type heated roll kept at 60° C. to elevate the film surface temperature to 40° C., and thereafter an alkaline solution with the following compositions was applied in a quantity of 14 ml/m² by using a bar coater and held for 10 seconds under a steam-type far-infrared heater heated up to 110° C. made by Noritake Co., Ltd., thereafter, pure water was similarly applied in a quantity of 3 ml/m² by using a bar coater. At this time, the film temperature was 40° C. Subsequently, washing by using a fountain coater and drainage by using an air knife were repeated 3 times and the resultant was held for 2 seconds at a drying zone kept at 70° C. to obtain a film sample 1. The film sample was 3% in equilibrium moisture content.

| (Compositions of alkaline solution) | |
|---|---|
| Potassium hydroxide | 4.7 mass parts |
| Water | 15.7 mass parts |
| Isopropanol | 64.8 mass parts |
| Propylene glycol | 14.9 mass parts |
| Surface active agent ($C_{16}H_{33}O(CH_2CH_2O)_{10}H$) | 1.0 mass part |

<Formation of Oriented Film>

The coating solution with the following compositions was applied in a quantity of 24 mL/m² to the film sample 1 by using a No. 14 wire bar coater. The resultant was air-dried for 60 seconds at 60° C. and for another 150 seconds at 90° C.

| (Compositions of coating solution for oriented film) | |
|---|---|
| Modified polyvinyl alcohol represented by the following formula | 40 parts |

-continued

| (Compositions of coating solution for oriented film) | |
|---|---|
| Water | 728 mass parts |
| Methanol | 228 mass parts |
| Glutaric aldehyde (cross-linking agent) | 2 mass parts |
| Citric acid | 0.08 mass part |
| Monoethyl ester citrate | 0.29 mass part |
| Diethylester citrate | 0.27 mass part |
| Triethyl ester citrate | 0.05 mass part |
| Modified polyvinyl alcohol | |

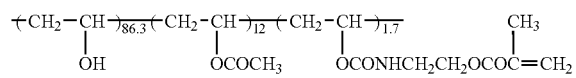

<Formation of Optically Anisotropic Layer Consisting of Discotic Liquid Crystal Compound>

A coating solution containing the following compositions of a discotic liquid crystal layer was continuously applied in a length of 50 m by using a No. 3 wire bar to the oriented film which was formed on the above film sample 1.

| (Compositions of coating solution for discotic liquid crystal layer) | |
|---|---|
| Discotic liquid crystal compound TE-8, (that with (8) m = 4) | 32.6% by mass |
| Compound represented by the formula (1) in the description (exemplified compound 1-5) | 0.05% by mass |
| Ethylene oxide modified trimethylol propane triacrylate (V#360, Osaka Organic Chemical Industry Ltd.) | 3.2% by mass |
| Sensitizer (Kayacure DETX, Nippon Kayaku Co., Ltd.) | 0.4% by mass |
| Photo polymerization initiator (Irgacure-907, made by Ciba Geigy Corporation) | 1.1% by mass |
| Methylethyl ketone | 62.0% by mass |
| Fluorine-containing polymer described in the description (exemplified compound P-75) | 0.14% by mass |

After application of the above solution, the liquid crystal layer was heated and dried for 2 minutes at a drying zone at 130° C. to orient the discotic liquid crystal compound. Next, the layer was subjected to UV radiation under a 120 W/cm high-pressure mercury lamp at a 80° C. UV radiation zone for 4 seconds to polymerize the discotic liquid crystal compound. Thereafter, the layer was cooled down to a room temperature and wound up. The thus prepared optically anisotropic layer exhibited an optically negative refractive anisotropy, having 0.82 µm film thickness, Re=0 nm and Rth=50 nm at a 550 nm wavelength and 0.061Δn. The discotic liquid crystal compound of the optically anisotropic layer exhibited a horizontal orientation in a range of ±1°.

<Preparation of Lower Polarizing Plate>

The above film sample 1 and laminated optically anisotropic layer were attached to one side of the polarizing film and Fuji Tack TD80UF was attached to the other side of the polarizing film. This step was conducted with a polyvinyl alcohol adhesive agent by roll-to-roll process to prepare an integral-type polarizing plate. Regarding the lamination angle of each film, in FIG. 2, the polarizing film absorption axis 104 (15 in FIG. 1) was set to be 90° and the protective film slow phase axes 102 and 106 were set respectively to 90° on the basis of the lateral direction (0°) when the display device was viewed above.

The thus prepared lower polarizing plate was assembled into the liquid crystal display device in such a way that the optically anisotropic layer 10 was in contact with the lower liquid crystal cell substrate 8.

<Preparation of Upper Polarizing Plate>

The film sample 1 was used as protective films 101 and 105. In addition, one sheet of biaxial retardation film C made of a stretched film was placed between the upper polarizing plate 1 and the upper liquid crystal cell substrate 5 so that the in-plane slow axis of the retardation film corresponded to the transmission axis of the upper polarizing plate 1.

<Preparation of Retardation Film C>

Polycarbonate (molecular weight of 100,000) was dissolved in methylene chloride to prepare a 20% by weight solution. The solution was cast on a steel belt and dried to prepare a film smaller in thickness variation, which was peeled off from the belt surface.

While the film was retained with a pin tenter, the film-width end at the entrance of the pin tenter was stretched toward the film-width direction, with the both ends of the film retained, so that the width of the retained film was similar to that of the film. In this instance, the film was heated so that the temperature around the film reached 130° C., and the width of the film retained by the pin tenter was progressively increased and stretched 1.13 times. The film completed for the stretching process was cooled to a room temperature while being retained with the pin tender.

The thus prepared film was further subjected to a longitudinal stretching process at a fixed stretch ratio of 1.02 and at 155° C. of the stretch temperature. The film was cooled down to a room temperature during the cooling process to obtain a biaxial film. Thus-obtained film C was characterized by the film thickness of 92 µm, Re=50 nm and Rth=90 nm.

<Determination of Retardation Value and Slow Axis Angle>

An automatic birefringence analyzer KOBRA-21ADH (made by Oji Scientific Instruments Co., Ltd.) was used to measure samples before alkaline saponification for three-dimensional refractive index at a 590 nm wavelength under the respective conditions of 23° C./10% RH, 23° C./60% RH and 23° C./80% RH. Rth and Re were calculated from the measured values. Table 1 shows the results. Table 1 shows the results of the evaluation of the sample films and the liquid crystal display devices. In Table 1, Rth 1 denotes a retardation at 23° C. and 10%, Rth 2 denotes a retardation at 23° C. and 60%, Rth 3 denotes a retardation at 23° C. and 80%, Re denotes a retardation in the direction of in-plane of the film, ΔRth (1-3) denotes a difference between Rth 1 and Rth and ΔRth change denotes a value obtained by dividing ΔRth by Rth-2.

<Evaluation of Retardation Film and Determination of Light Leak from the Prepared Liquid Crystal Display Device>

Determination was made for the dependence of transmission efficiency on viewing angle in the thus prepared liquid crystal display device. Elevation angle was determined from the front to the oblique direction every 10 degrees up to 80 degrees, and an azimuthal angle was determined every 10 degrees up to 360 degrees based on horizontal and right direction (0°). It was then found that the light leak transmission efficiency increased with an increase in the elevation angle from the front direction, and the luminance during black indication reached its maximum at the elevation angle of approximately 60°. It was also found that an increased transmission efficiency during black indication resulted in deterioration of the contrast. Therefore, the viewing angle characteristic was evaluated by referring to the front trans mission efficiency during black indication and maximum values of the light leak transmission efficiency at the elevation angle of 60°. Evaluation was made for display properties at 23° C./60% RH and for fluctuation of the display properties at 23° C./80% RH and at 23° C./10% RH. Table 1 shows the results.

EXAMPLE 2

In Example 1, the residual solvent quantity and film thickness on peeling were changed as shown in Table 1, to prepare the film sample 2, and in the upper polarizing plate and the lower polarizing plate, the film sample 2 was used in place of the film sample 1 to prepare a liquid crystal display device.

COMPARATIVE EXAMPLE 1

In the upper polarizing plate and the lower polarizing plate of Example 1, a commercially available cellulose acetate film (Fuji Tac TD80UF, Fuji Photo Film Co., Ltd. Re value=3 nm and Rth value=50 nm) was used in place of the film sample 1 to prepare a liquid crystal display device.

EXAMPLES 3, 4 AND COMPARATIVE EXAMPLE 2

All the procedures were done similarly as in Examples 1 and 2 and Comparative Example 1, except that the optically anisotropic layer was used in which the discotic liquid crystal layer was adjusted to be 110 nm in Rth and one sheet of the monoaxial retardation film D was disposed in place of the biaxial retardation film C of the upper polarizing plate (Examples 3 and 4, Comparative Example 2). In this instance, the structure was made in such a way that the in-plane slow axis of the retardation film corresponded to the transmission axis of the upper polarizing plate 1.

<Preparation of Retardation Film D>

Polycarbonate (molecular weight of 100,000) was dissolved in methylene chloride to prepare a 20% by weight solution. The solution was cast on a steel belt and dried to provide a film smaller in thickness variation, which was peeled off from the belt surface.

While the film was retained with a pin tenter, the film-width end at the entrance of the pin tenter was stretched in the film-width direction, with both ends of the film retained, so that the width of the retained film was made similar to that of the film. In this instance, the film was heated so that the temperature around the film reached 130° C., and the width of the film retained by the pin tenter was progressively increased and stretched 1.02 times. The film completed for the stretching process was cooled to a room temperature while being retained with the pin tender.

Thus-obtained film was characterized by film thickness of 90μ, Re=95 nm and Rth=47 nm.

EXAMPLES 5, 6 AND COMPARATIVE EXAMPLE 3

All the procedures were done similarly as in Examples 1, 2 and Comparative Example 1, except that the optically anisotropic layer was used in which the discotic liquid crystal layer was adjusted to be 110 nm in Rth and the retardation film made of rod-like liquid crystal compounds was used in place of the biaxial retardation film C of the upper polarizing plate (Examples 5 and 6, Comparative Example 3).

EXAMPLE 7

| (Doping composition 2) | |
|---|---|
| Cellulose acylate (substitution degree of acetyl group: 2.0%, substitution degree of propionyl group: 0.8) | 100 mass parts |
| Tinuvin 326 (made by Ciba Specialty Chemicals) | 0.3 mass parts |
| Tinuvin 171 (made by Ciba Specialty Chemicals) | 0.5 mass parts |
| Tinuvin 109 (made by Ciba Specialty Chemicals) | 0.5 mass parts |
| Ethylphthalyl ethylglycolate | 2 mass parts |
| Triphenyl phosphate | 10 mass parts |
| Methylene chloride | 320 mass parts |
| Ethanol | 20 mass parts |

The above composition was fed into a sealed container, kept at 80° C. under pressure and agitated so as to obtain a complete dissolution. Next, the dope composition was filtered, cooled and kept at 31° C. and cast uniformly on a 6-meter long endless stainless steel band rotating which was placed between two drums. Subsequently, at the time when a solvent was allowed to evaporate until the remaining solvent is 70%, the cast film was peeled from the stainless steel band at a tensile force of 17 kg/m, transferred at a tensile force of 13 kg/m and dried to obtain film sample 4.

A liquid crystal display device was prepared in the same manner as in Example 1 except that the film sample 4 was used in place of the film sample 1.

EXAMPLE 8

| (Doping composition 3) | |
|---|---|
| Cellulose acylate (substitution degree of acetyl group: 1.9%, substitution degree of propionyl group: 0.8) | 100 mass parts |
| Tinuvin 326 (made by Ciba Specialty Chemicals) | 0.3 mass parts |
| Tinuvin 171 (made by Ciba Specialty Chemicals) | 0.1 mass parts |
| Tinuvin 109 (made by Ciba Specialty Chemicals) | 0.2 mass parts |
| Ethylphthalyl ethylglycolate | 2 mass parts |
| Triphenyl phosphate | 5 mass parts |
| Methylene chloride | 420 mass parts |
| Ethanol | 20 mass parts |

The above composition was fed into a sealed container, kept at 80° C. under pressure and agitated so as to obtain a complete dissolution. Next, the dope composition was filtered, cooled and kept at 31° C. and cast uniformly on a 6-meter long endless stainless steel band rotating which was placed between two drums. Subsequently, at the time when a solvent was allowed to evaporate until the remaining solvent is 75%, the cast film was peeled from the stainless steel band at a tensile force of 17 kg/m, transferred at a tensile force of 13 kg/m and dried to obtain film sample 5.

A liquid crystal display device was prepared in the same manner as in Example 1 except that the film sample 5 was used in place of the film sample 1.

<Preparation of Retardation Film Made of Rod-Like Liquid Crystal>

(Formation of Oriented Film)

A coating solution with the following compositions was applied to the reverse surface of the thus prepared film sample (plane opposite to the plane to which the polarizing film was attached) at a quantity of 26.3 mL/m² by using a No. 15 wire bar coater.

| (Compositions of coating solution for oriented film) | |
|---|---|
| Following macromolecule compounds P | 4 mass parts |
| Triethyl amine | 2 mass parts |
| 5% aqueous solution of Deconal EX-521 (epoxy compound made by Nagase Kasei Kogyo) | 8.1 mass parts |
| Water | 57 mass parts |
| Methanol | 29 mass parts |

Macromolecule compound P $$-(CH_2CH)_{55}-(CH_2CH)_5-(CH_2CH)_{40}-$$
(with COOH, ester-propyl-methacrylate, and carbazole side groups)

The oriented film was dried at 25° C. for 30 seconds and also at 120° C. for 120 seconds by hot air. After being dried, the film was 1.0 μm in thickness. Thereafter, the film was subjected to rubbing treatment in the same direction with the slow axis (longitudinal direction: determined at 550 nm) of the transparent optical film A.

(Formation of Optically Anisotropic Layer Made of Liquid Crystal Compound)

The first optically anisotropic layer was formed on the thus prepared oriented film. To be specific, a coating solution with the following compositions was applied continuously to the above oriented film by using a bar coater, dried and heated (orientation and aging). Further, the film was exposed to ultraviolet rays to form a 0.7 μm-thick horizontally-oriented optically anisotropic layer.

| (Compositions of coating solution for optically anisotropic layer) | |
|---|---|
| Rod-like liquid crystal compound described in the description (exemplified compound IV-2) | 38.1% by mass |
| Following sensitizer A | 38% by mass |
| Following light polymerization initiator B | 1.14% by mass |
| Orientation controlling agent C | 0.19% by mass |
| Glutaric aldehyde | 4% by mass |

-continued

| (Compositions of coating solution for optically anisotropic layer) | |
|---|---|
| Methyl ethylketone | 60.15% by mass |

Sensitizer A (thioxanthone with two Et groups)

Photo polymerization initiator B (Me-S-phenyl-C(Me)_2-C(=O)-morpholine structure)

Orientation controlling agent C $$-(CH_2CH)_2-O-C(=O)-CH_3 \quad -(CH_2CH)_{21}-OH \quad -(CH_2CH)_{77}- (dioxane with nC_3H_7)$$

The thus formed optically anisotropic layer has the slow axis 4 in the direction orthogonal to the longitudinal direction (rubbing direction) of the film sample, and exhibited Re value of 85 nm at 550 nm. It also has an optically positive refractive anisotropy and Re value of 9119 nm in the entire visible light range.

COMPARATIVE EXAMPLE 4

In Example 1, the residual solvent quantity and film thickness on peeling were changed as shown in Table 1, to prepare the film sample 3, and the upper and lower polarizing plates were prepared without using the optically anisotropic layer made of discotic liquid crystal compounds and biaxial retardation films, and only TAC was used to fabricate a liquid crystal display device.

TABLE 1

| | Optical film for lower optical anisotropic layer | Optical film for upper optical anisotropic layer | Retardation film C | Optical film Film thickness (μm) | Amount of Remaining solvent when peeling (%) | Re | Rth1 |
|---|---|---|---|---|---|---|---|
| Example 1 | Sample 1 | Sample 1 | Biaxial | 60 | 50 | 8 | 55 |
| Example 2 | Sample 2 | Sample 2 | Biaxial | 80 | 70 | 9 | 68 |
| Comparative Example 1 | TD80UF | TD80UF | Biaxial | 80 | — | 3 | 65 |
| Example 3 | Sample 1 | Sample 1 | Biaxial | 60 | 50 | 8 | 55 |
| Example 4 | Sample 2 | Sample 2 | Biaxial | 80 | 70 | 9 | 68 |

TABLE 1-continued

| | | | | | | | |
|---|---|---|---|---|---|---|---|
| Comparative Example 2 | TD80UF | TD80UF | Biaxial | 80 | — | 5 | 65 |
| Example 5 | Sample 1 | Sample 1 | Monoaxial | 60 | 50 | 8 | 55 |
| Example 6 | Sample 2 | Sample 2 | Monoaxial | 80 | 70 | 9 | 68 |
| Comparative Example 3 | TD80UF | TD80UF | Monoaxial | 80 | — | 5 | 65 |
| Comparative Example 4 | Sample 3 | Sample 3 | — | 130 | 90 | 3.2 | 120 |
| Example 7 | Sample 4 | Sample 4 | Biaxial | 80 | 70 | 8 | 70 |
| Example 8 | Sample 5 | Sample 5 | Biaxial | 60 | 75 | 9 | 67 |

| | Optical film | | | | Transmission efficiency (23° C., 60%) | | Fluctuation of display properties |
|---|---|---|---|---|---|---|---|
| | Rth2 | Rth3 | ΔRth (1-3) | ΔRth change (%) | Front | Elevation angle: 60 degree | |
| Example 1 | 50 | 47 | 8 | 16 | 0.05% | 0.09% | ⊚ |
| Example 2 | 57 | 51 | 17 | 30 | 0.05% | 0.09% | ○ |
| Comparative Example 1 | 50 | 43 | 22 | 44 | 0.05% | 0.07% | x |
| Example 3 | 50 | 47 | 8 | 16 | 0.05% | 0.06% | ⊚ |
| Example 4 | 57 | 51 | 17 | 30 | 0.05% | 0.09% | ○ |
| Comparative Example 2 | 50 | 43 | 22 | 44 | 0.05% | 0.08% | x |
| Example 5 | 50 | 47 | 8 | 16 | 0.05% | 0.09% | ⊚ |
| Example 6 | 57 | 51 | 17 | 30 | 0.05% | 0.09% | ○ |
| Comparative Example 3 | 50 | 43 | 22 | 44 | 0.05% | 0.06% | x |
| Comparative Example 4 | 114 | 106 | 14 | 12 | 0.04% | 0.60% | ⊚ |
| Example 7 | 59 | 50 | 20 | 34 | 0.05% | 0.09% | ○ |
| Example 8 | 57 | 49 | 18 | 32 | 0.05% | 0.09% | ○ |

Fluctuation of display properties was evaluated by the following standard:

⊚: No fluctuation was found in the observation angles, i.e. very excellent

○: Extremely slight fluctuation was found in the observation angles, i.e. excellent Δ: Slight fluctuation was found in the observation angles x: Large fluctuation was found in the observation angles xx: Very large fluctuation was found in the observation angles, i.e. poor As is apparent from the results of Examples shown in Table 1, a smaller fluctuation of display properties was observed in the sample films which show a smaller ΔRth change. Further, where the retardation film (discotic liquid crystal compound, retardation films C and D) used in the invention was not used, fluctuation of display properties were small but the display properties (Rth 2) at 23° C. and 60% RH (basic characteristics) were poorer than those in the invention.

The present disclosure relates to the subject matter contained in Japanese Patent Application No. 388308/2003 filed on Nov. 18, 2003 and Japanese Patent Application No. 327390/2004 filed on November 11, which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A liquid crystal display device comprising a pair of polarizing plates, a liquid crystal cell, a first optically anisotropic layer and a second optically anisotropic layer, wherein the liquid crystal cell, the first optically anisotropic layer and the second optically anisotropic layer are disposed between the polarizing plates, the polarizing plate comprises a polarizing film or the polarizing plate comprises a polarizing film and a protective film on a plane of the polarizing film nearer to the liquid crystal cell, the pair of polarizing plates are at right angles to each other at the absorption axes of the respective polarizing films, the liquid crystal cell comprises a pair of substrates and a liquid crystal layer containing liquid crystal molecules interposed between the substrates, the liquid crystal molecules are oriented approximately perpendicular to the substrate of the liquid crystal cell, the first optically anisotropic layer is 40 to 200 nm in retardation value (Re) in an in-plane direction with respect to visible light, the second optically anisotropic layer is of an optically negative refractive anisotropy, 10 nm or lower in Re with respect to visible light and 30 to 250 nm in retardation value (Rth) in the thickness direction, at least one of the first optically anisotropic layer and the second optically anisotropic layer is formed on an optical film satisfying that Rth is 0 to 150 nm at 23° C./60% RH and the difference between Rth at 23° C./10% RH and Rth at 23° C./80% RH is 40% or less of Rth at 23° C./60% RH, and the optical film may be the substrate of the liquid crystal cell, the protective film on a plane of the polarizing film nearer to the liquid crystal cell, or the polarizing film.

2. The liquid crystal display device according to claim 1, wherein the difference between Rth at 23° C./10% RH and Rth at 23° C./80% RH is 20% or less of Rth at 23° C./60% RH.

3. The liquid crystal display device according to claim 1, wherein the optical film satisfies $|Re| \leq 15$ nm.

4. The liquid crystal display device according to claim 1, wherein the variation range in angle of the slow axis of the optical film is below 3 degrees.

5. The liquid crystal display device according to claim 1, wherein the optical film has a thickness of 40 to 250 μm.

6. The liquid crystal display device according to claim 1, wherein the optical film is a cellulose ester film.

7. The liquid crystal display device according to claim 1, wherein the optical film is an acetyl cellulose film.

8. The liquid crystal display device according to claim 1, wherein the optical film is the protective film on a plane of the polarizing film nearer to the liquid crystal cell.

9. The liquid crystal display device according to claim 1, wherein the first optically anisotropic layer and the second optically an isotropic layer are formed on the respective optical films.

10. The liquid crystal display device according to claim 1, wherein the first optically anisotropic layer is a monoaxial optically anisotropic layer.

11. The liquid crystal display device according to claim 1, wherein the first optically anisotropic layer is a biaxial optically anisotropic layer.

12. The liquid crystal display device according to claim 1, wherein the first optically anisotropic layer comprises at least one kind of rod-like liquid crystal molecule.

13. The liquid crystal display device according to claim 1, wherein the first optically anisotropic layer satisfies $50 \leq Re \leq 120$ nm.

14. The liquid crystal display device according to claim 1, wherein the second optically anisotropic layer contains at least one kind of discotic liquid crystal molecule.

15. The liquid crystal display device according to claim 14, wherein the second optically anisotropic layer contains at least one horizontal orientation agent.

16. The liquid crystal display device according to claim 1, wherein the second optically anisotropic layer contains at least one fluorine-containing polymer.

17. The liquid crystal display device according to claim 1, wherein the second optically anisotropic layer is a biaxial optically anisotropic layer.

18. The liquid crystal display device according to claim 1, wherein the second optically anisotropic layer satisfies $Re \leq 5$ nm.

19. The liquid crystal display device according to claim 1, wherein the second optically anisotropic layer satisfies $40 \leq Rth \leq 150$ nm.

20. The liquid crystal display device according to claim 1, wherein the liquid crystal cell is a VA-mode liquid crystal cell.

* * * * *